United States Patent
Maeda et al.

(10) Patent No.: US 7,494,725 B2
(45) Date of Patent: Feb. 24, 2009

(54) MAGNETIC RECORDING MEDIUM, METHOD FOR MANUFACTURING RECORDING MEDIUM AND MAGNETIC RECORDING APPARATUS

(75) Inventors: Tomoyuki Maeda, Kawasaki (JP); Akira Kikitsu, Yokohama (JP); Soichi Oikawa, Kawasaki (JP); Takeshi Iwasaki, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 492 days.

(21) Appl. No.: 11/085,622

(22) Filed: Mar. 22, 2005

(65) Prior Publication Data

US 2005/0214592 A1 Sep. 29, 2005

(30) Foreign Application Priority Data

Mar. 25, 2004 (JP) .......................... P2004-090670

(51) Int. Cl.
G11B 5/66 (2006.01)
(52) U.S. Cl. ...................................................... 428/831
(58) Field of Classification Search .................. None
See application file for complete search history.

(56) References Cited

U.S. PATENT DOCUMENTS 6,403,241 B1 * 6/2002 Chen et al. ............... 428/832.2
6,670,055 B2   12/2003 Tomiyasu et al.
7,279,240 B2 * 10/2007 Nolan .......................... 428/828
2005/0142389 A1 * 6/2005 Hinoue et al. .......... 428/694 TS

FOREIGN PATENT DOCUMENTS

JP           62-134817        *   6/1987

OTHER PUBLICATIONS

English abstract of JP 62-134817.*
Chinese Patent Office, "Notification of First Office Action," 3 pp. (Aug. 4, 2006).
Dario Alfe et al., "The reconstruction of nickel and rhodium (001) surfaces upon carbon, nitrogen or oxygen adsorptions," Surface Science, Scoula Internazional Superiore di Studi Avanzati, et al. (Trieste, Italy), p. 18-28, (Aug. 11, 1999).

* cited by examiner

*Primary Examiner*—Holly Rickman
(74) *Attorney, Agent, or Firm*—Pillsbury Winthrop Shaw Pittman LLP

(57) ABSTRACT

A grain diameter controlling crystalline layer comprising crystalline grains of a metal selected from the group consisting essentially of Cu, Ni, Rh and Pt was formed on a substrate. Then, deposited atom layer of at least one element selected from the group consisting of oxygen and carbon was formed on the surface of the grain diameter control layer. A magnetic recording layer was deposited on the atoms deposited grain diameter controlling crystalline layer. Then a magnetic recording medium in which the magnetic crystalline grains has small grain diameter and small grain diameter distribution, and the magnetic recording medium shows increased signal to noise ratio at high recording density.

18 Claims, 16 Drawing Sheets

MAGNETIC RECORDING MEDIUM, METHOD FOR MANUFACTURING RECORDING MEDIUM AND MAGNETIC RECORDING APPARATUS

CROSS-REFERENCE TO RELATED APPLICATIONS

This application is based upon and claims the benefit of priority from the prior Japanese Patent Application No. 2004-090670, filed on Mar. 25, 2004; the entire contents of which are incorporated herein by reference.

BACKGROUND OF THE INVENTION

1. Field of the Invention

The present invention relates to magnetic recording media, methods for manufacturing recording media and a magnetic recording apparatus, in particular, to magnetic recording media having high recording density, methods for manufacturing the recording media and magnetic recording apparatus such as hard disk drives in which the high-density recording media are equipped.

2. Description of the Related Art

Hard disk drives (HDDs) have been expanding their application scope from the first computer related application to various other applications, such as home video recorder and car carrying navigation system applications as magnetic recording systems for recording and reproducing information. The expansion is due to their advantage such as high data access speed and high data storage reliability, in addition to their high recording capacity performance with low cost. Requirements for HDDs with larger recording capacity have been increased with the expansion of the HDD application scope. Replying to the requirements, large capacity recording technology has been advanced by increasing recording density of the magnetic recording media.

With increasing recording density of the magnetic recording media of HDDs, the recording bit sizes and the diameters for the magnetization reversal units became very small. As the result, a decreasing of recorded signal magnetization caused by thermal fluctuation and that results to a degrading of the recording and reproducing performance became notable for the very small magnetization reversal units. Furthermore, noise signals which appear at boundary regions between recording bits became large as a result of decreasing recording bits to a very small size, and the noise gave large influences upon the signal to noise ratio. Therefore, in order to attain higher recording density, it is required to stabilize thermal stability of the recorded signal magnetization at one hand, it is also required to attain low noise characteristics at high recording density at the other hand.

To decrease magnetic recording medium noise, size of magnetic crystalline grains constructing recording layer have been made smaller up to now. For example, magnetic crystalline grains of Co—Cr magnetic layer of widely used magnetic recording media were made small by adding small amount of Ta or B (refer to Japanese Patent Laid-open Applications Nos. HEI 11-154321 and 2003-338029), and by precipitating nonmagnetic Cr by heat treating at appropriate temperature (refer to Japanese Patent Laid-open Applications Nos. HEI 3-235218, and HEI 6-259764). Recently, methods for obtaining magnetic recording layers having so called granular structure by adding oxides such as $SiO_x$ to the magnetic layer were applied. In the granular structured magnetic layer, nonmagnetic grain boundary materials enclose magnetic crystalline grains (refer to Japanese Patent Laid-open Applications Nos. HEI 10-92637, and 2001-56922).

These methods, however, cannot control the crystalline grains of the magnetic-layer and the under-layer by going back to the nucleation processes for the crystalline grains of the under-layer and the magnetic recording layer. These methods control average magnetic crystalline grain diameter and grain boundary regions merely by choosing combination of raw materials, the raw material composition, or by choosing of depositing conditions. When the crystalline grains in the under-layer are made smaller, the crystalline quality and crystal orientation degree of the grains in the under-layer are degraded, and the degraded crystalline grains of the under-layer influence upon the formation of magnetic crystalline grains. Actually it was found that the magnetic layer prepared using this method showed broad grain size distribution and broad distribution of grain boundary width. Magnetic recording media decreasing the average grain size of the magnetic crystalline grains to 5 nm showed poor thermal fluctuation durability. Very small grains unstable to thermal fluctuation were included at large fraction. Then it was difficult to attain further high density using this method.

To obtain low noise magnetic recording medium having small magnetic crystalline grains, nucleation of magnetic crystalline grains were controlled using a layer of such as Nb for nucleation layer on a substrate for forming magnetic recording layer (refer to Japanese Patent Laid-open Application No. 2002-22518). To attain higher recording density realizing thermal stability of recording magnetization and low noise, however, further additional advanced technology was needed.

SUMMARY

The important problems to be solved in order to attain higher recording density are to realize small average grain diameter of magnetic recording layer to obtain low noise magnetic recording medium and small grain diameter dispersion diminishing very small particles unstable to thermal fluctuation.

The present invention is directed to give a solution to the problems. The purpose of the present invention is to present a novel magnetic recording medium having excellent recording signal resolution and signal to noise ratio (SNR) realizing small average grain diameter dispersion, methods for manufacturing the magnetic recording medium, and magnetic recording apparatus equipped with the recording medium.

The inventors of the present invention have performed various exploring work and have got interesting finding that the magnetic crystalline grains of the magnetic layer can be made small with very small grain size distribution when the magnetic recording layer is formed on a film of oxide or carbon deposited Cu, Ni, Rh or Pt film. After carrying out a further investigation, the inventors could solve the problems described above and completed the present invention.

The magnetic recording medium of the present invention comprises a substrate, an under-layer formed on the substrate, and a magnetic recording layer on the under-layer formed on the magnetic recording layer. The under-layer of the present invention includes grain diameter control under-layer comprising crystalline grains of a metal selected from the group consisting essentially of Cu, Ni, Rh and Pt, and a deposited layer of at least one element selected from the group consisting of oxygen and carbon on the grain diameter control layer surface.

The method for producing magnetic recording medium of the present invention comprises a process for forming a grain diameter control under-layer comprising crystalline grains of a metal selected from the group consisting essentially of Cu, Ni, Rh and Pt on a substrate, a process for forming an deposited atom layer depositing atoms of at least one element selected from the group consisting of oxygen and carbon on the grain diameter control layer surface, and a process for forming a magnetic recording layer on the substrate having the atom deposited grain diameter control under-layer.

Furthermore, the magnetic recording and reproducing apparatus of the present invention comprises the magnetic recording medium described above, a recording medium driving mechanism, driving the magnetic recording medium, a recording and reproducing head mechanism, recording information to the magnetic recording medium and reproducing from the magnetic recording medium, a head driving mechanism, driving the recording and reproducing head and a recording and reproducing signal processing system, processing recording signals and reproducing signals.

The present invention has a remarkable advantage in the point that the crystalline grain size of the grain diameter control under-layer comprising crystalline grains is not needed to be small for obtaining small magnetic crystalline grains. The problem of employing small grain size under-layers, therefore, can be avoided to obtain small magnetic grains. The present invention presents a novel means for obtaining magnetic recording medium having increased recording and reproducing characteristics.

The detailed mechanism of obtaining small grain sizes by using grain diameter control under-layer comprising crystalline grains of a metal selected from the group consisting essentially of Cu, Ni, Rh and Pt, is not clear at present. Here, two papers concerned with reorientation of atoms such as oxygen or carbon on clean metal single crystal surface are introduced and a comparison between the present invention and the two papers are given.

In one of the papers appeared in Surface Science Vol. 437 pp 18-28, regularly rearranged surface structure of deposited oxygen atoms and carbon atoms on Ni and Rh surface cleaned up in high vacuum is reported.

In the other paper appeared in Materials Science and Engineering Vol. B96 pp. 169-177, an explanation for the ordered arrangement is given by stress interaction appeared on the clean bulk single crystal surface.

Comparing the present invention with the two papers on ordered arrangement of the nitrogen atoms described in the two papers, it can be pointed out that the under-layer in the present invention is films of Cu, Ni, Rh or Pt, and not of a bulk single crystal. The state having stress in the thin film of the present invention is quite different from the bulk Cu single crystal surface of these papers. Therefore, the re-oriented ordered surface structure shown in the papers cannot be expected for the film of the present invention. At present, the mechanism of the present invention obtaining small grain size is not clear. To find out the mechanism of the present invention is an important problem to be solved.

Descriptions about absorbing oxygen and absorbing nitrogen are found in the Japanese Patent Laid-open Application No. 2002-22518 mentioned above. In this patent application, Nb containing alloy under-layer for obtaining small crystalline grains is described. As an example of the invention, physical absorption of oxygen and nitrogen to the under layer is described. In this case, notable effect found in the present invention is not obtained possibly because the absorbed oxygen and nitrogen are absorbed on Nb substrate and not on Cu, Ni, Rh or Pt. Furthermore, oxygen, fluorine and nitrogen contained magnetic recording medium is described in Japanese Patent Laid-open Application No. HEI 5-128481. Notable effect found in the present invention is not obtained in this case, because oxygen, fluorine and nitrogen are contained in its substrate to obtain an effect similar to a textured structure and are not deposited on the under-layer.

The present invention provides a novel means for obtaining magnetic layer having very small magnetic crystalline grains and magnetic recording media for high density recording having increased signal to noise ratio.

DETAILED DESCRIPTION

Hereinafter, embodiments of the present invention will be described in detail with reference to the drawings.

Figure 1:
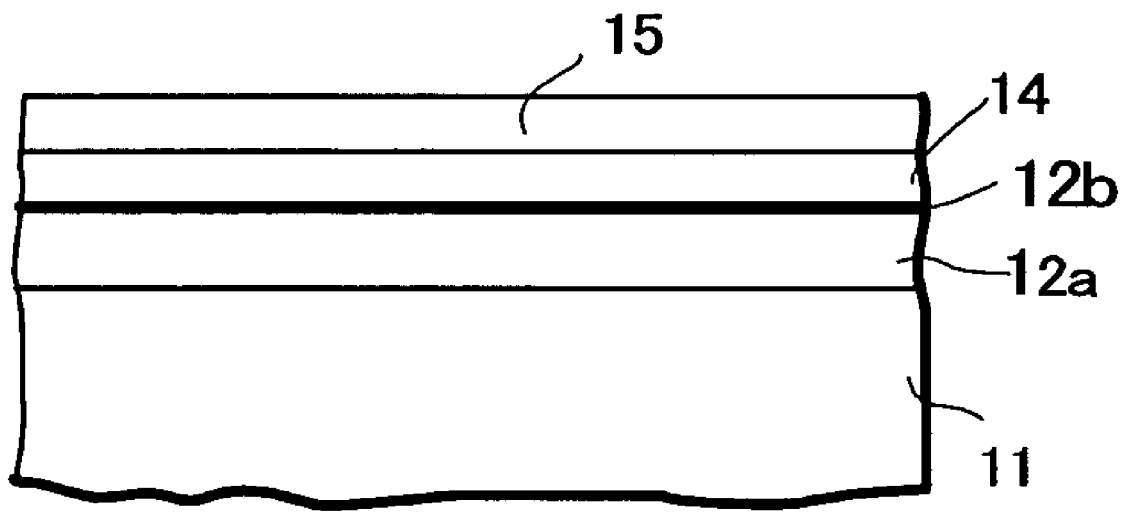
FIG. 1 is a schematically drawn cross section view of a magnetic recording medium according to an embodiment of the present invention.

FIG. 1 is a schematically shown cross section view of a magnetic recording medium according to an embodiment of the present invention. A grain diameter controlling under layer 12a of at least one selected from Cu, Ni, Rh, and Pt is disposed on a substrate 11 shown in FIG. 1. A deposited atom layer 12b of at least one element selected from the group consisting of oxygen and carbon is formed on the diameter control under-layer 12a. A magnetic recording layer 14 is disposed on the deposited atom layer 12b, and a protective and lubricant layer 15 is formed on the magnetic recording layer 14.

Quantity of the deposited oxygen or carbon atoms desirable for the deposited atom layer 12b on the surface of the grain diameter control under-layer 12a is in a range from $1 \times 10^{13}$ atoms/cm$^2$ to $1 \times 10^{10}$ atoms/cm$^2$ expressed by average number of atoms per unit area. When the quantity is less than $1 \times 10^{13}$ atoms/cm$^2$, notable average grain diameter decreasing effect on the magnetic recording layer cannot be obtained. Furthermore, magnetic crystalline grain orientation of the magnetic recording layer decreases when the quantity is larger than $1 \times 10^{15}$ atoms/cm$^2$. The quantity of the deposited oxygen or carbon atoms is more desirable to be in a range from $5 \times 10^{13}$ atoms/cm$^2$ to $5 \times 10^{14}$ atoms/cm$^2$.

Number and position of oxide atoms and carbide atoms can be evaluated by a secondly ion mass spectroscopy (SIMS) method. Other methods for example, nuclear reactor analysis (NRA) using high energy hydrogen ions or deuteron ions radiation as reported in Applied Physics Letters Vol. 80 pp. 1803-1805 and Applied Physics Letters Vol. 61 pp. 327-329, Rutherford back scattering, X-ray photoelectron spectroscopy (XPS), and Auger electron spectroscopy (AES) can be used for evaluating the number of the atoms. Furthermore, atom probe method described in Applied Physics Letters Vol. 69 pp. 3095-3097 can be used for the evaluation.

As a means for depositing oxygen atoms on the surface of grain diameter control under-layer 12a, a method of exposing grain diameter control under-layer 12a after deposition to oxygen atmosphere, oxygen plasma or oxygen radicals can be applied. As a means for depositing carbon atoms, a method of exposing to ethylene or acetylene atmosphere can similarly be applied. Other methods of exposing to carbon monoxide atmosphere can be applied to deposit both oxygen and carbon to the surface.

The crystalline grains desirable for the grain diameter control under-layer 12a are grains having broader flat surface for obtaining the magnetic recording layer 14 with better crystallinity. Accordingly, larger average grain diameter of the Cu grains is desirable. The desirable average grain diameter of the Cu grains is 50 nm or larger, and more desirable average grain diameter is 100 nm or larger. A single crystal film having no grain boundary is much more desirable. When the film is uneven at a certain degree, the film can be available provided that the film has large fraction of terrace surfaces that form the film surface.

The grain diameter control under-layer 12a in which the same crystallographic face of each grain is oriented parallel to the same plane is desirable because higher magnetic crystalline grain orientation can be obtained in the magnetic recording-layer 14. For the grain diameter control under-layer 12a having Cu, Rh, and Ni crystalline grains, grain orientation of their (100) planes parallel to the substrate surface is desirable, and for the grain diameter control under-layer 12a having Pt crystalline grains, grain orientation of their (111) planes parallel to the substrate surface is desirable for obtaining significantly small size magnetic crystalline grains in the magnetic recording layer 14.

The magnetic crystalline grains in the magnetic recording layer 14 are formed in plural per one crystalline grain of the grain diameter control layer 12a on average. The desirable average areal density of the magnetic crystalline grains in the magnetic recording-layer is in a range from $1 \times 10^{12}$ grains/cm$^2$ to $8 \times 10^{12}$ grains/cm$^2$ for obtaining large reproduced output of the recorded signal. When the average areal density of the magnetic crystalline grains is less than $1 \times 10^{12}$ grains/cm$^2$, the SNR decreases and when the average areal density is above $8 \times 10^{12}$ grains/cm$^2$, the SNR decreases again.

Figure 2:
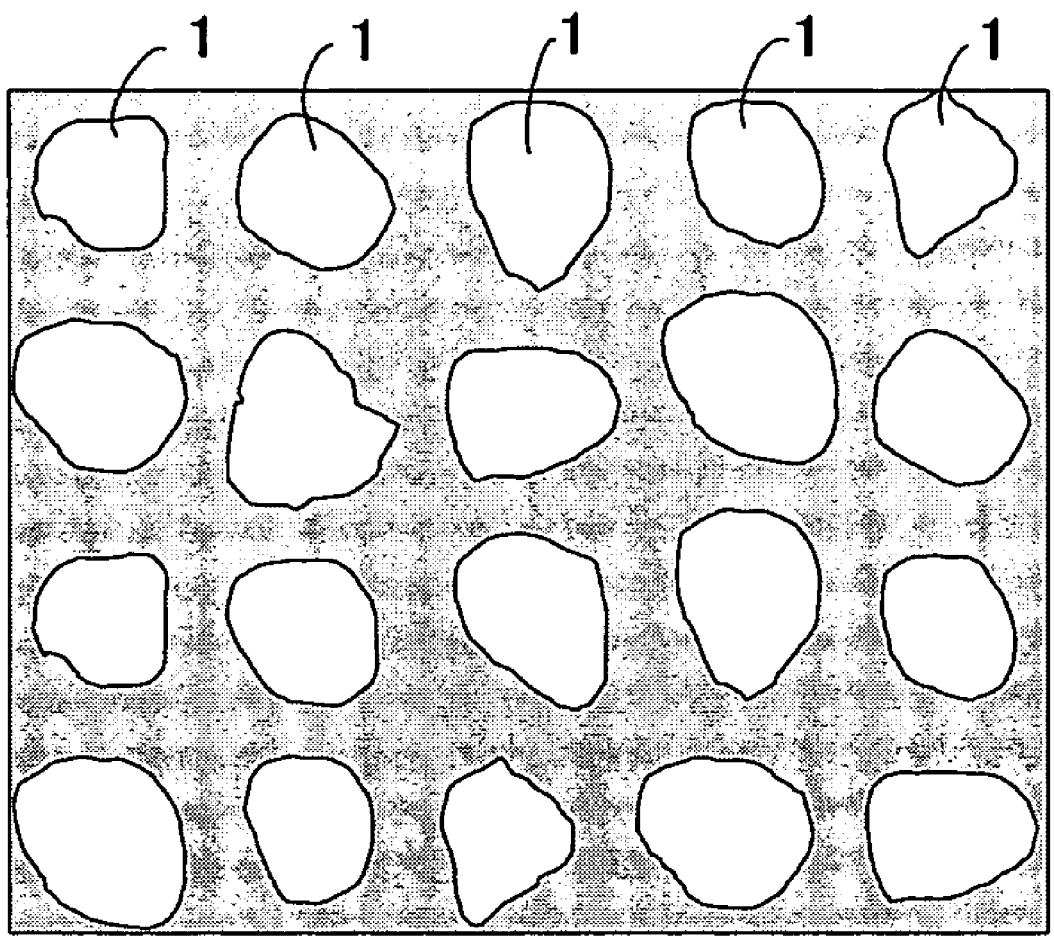
FIG. 2 is a schematically drawn in-plane view of a magnetic recording layer for a magnetic recording medium showing magnetic crystalline grains arranged in a form of a tetragonal lattice structure according to an embodiment of the present invention.

The experimental results of the present inventors show that the magnetic crystalline grain arrangement of an ordered structure in a tetragonal lattice is desirable, when the grain diameter control under layer 12a comprises crystalline particles of Cu, Rh, or Ni. The noise level of recording and reproducing characteristics can be substantially reduced when the ordered structure was formed compared when the ordered structure arrangement is not formed. FIG. 2 schematically shows an in-plane structure of the magnetic recording layer of the magnetic recording medium. The white subjects express magnetic grains 1. Tetragonal lattice structure arrangement of magnetic crystalline grains 1 can be evaluated by image processing and analyzing the transmission electron microscope (TEM) in-plane Figures of the magnetic recording layer 14.

Figure 3:
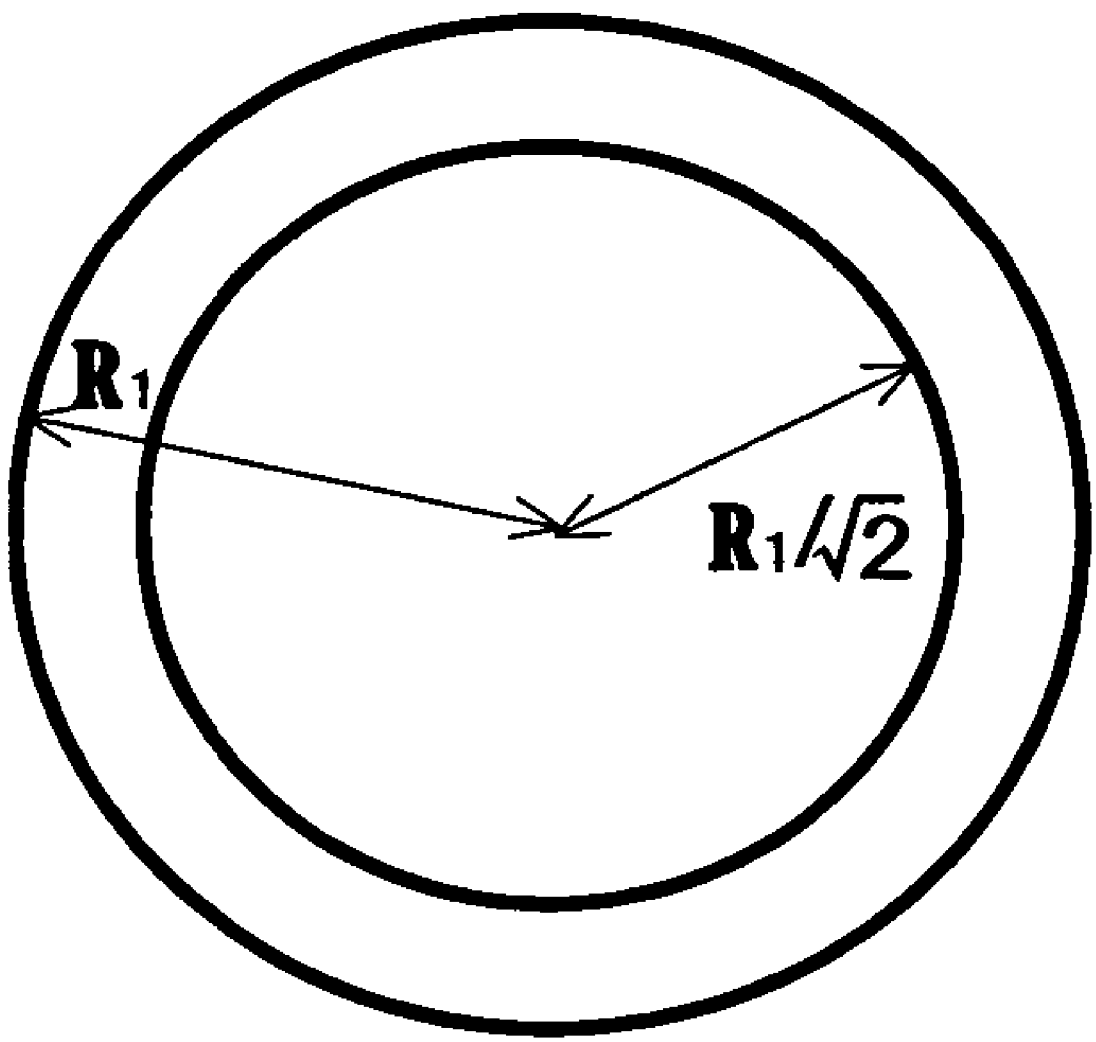
FIG. 3 is a schematically drawn example of a ring pattern for the reciprocal lattice for the tetragonal lattice structure.

Using an image processing and analyzing software, a spectrum can be obtained as a result of a fast Fourier transformation of a binary Figure obtained by increasing contrast of a Figure for magnetic crystalline grains and grain boundary regions. The magnetic crystalline grains can be regarded to have an arrangement of tetragonal lattice structure essentially when patterns as shown in FIG. 3 can be recognized in the spectrum. Practically, the arrangement can be confirmed by finding two type periodical spots or rings having a ratio of the distances to the center of $1:1/\sqrt{2}$ ($R_1$ and $R_1/2^{1/2}$ in FIG. 3). Similar evaluation can be performed using low energy electron diffraction to the magnetic recording layer and analyzing the diffraction patterns.

Figure 4:
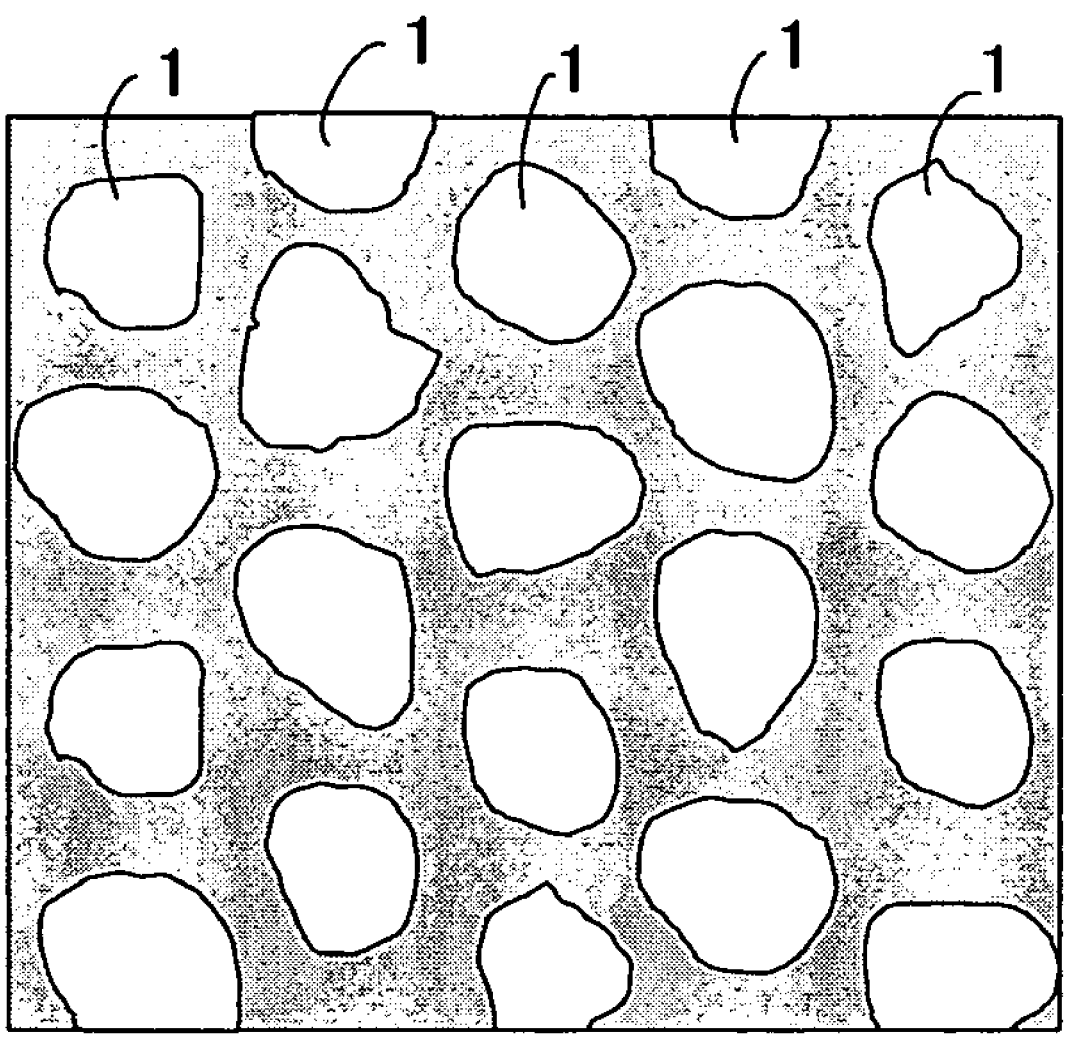
FIG. 4 is a schematically drawn a in-plane view of a magnetic recording layer for a magnetic recording medium showing magnetic crystalline grains arranged in a form of a hexagonal lattice structure according to an embodiment of the present invention.
Figure 5:
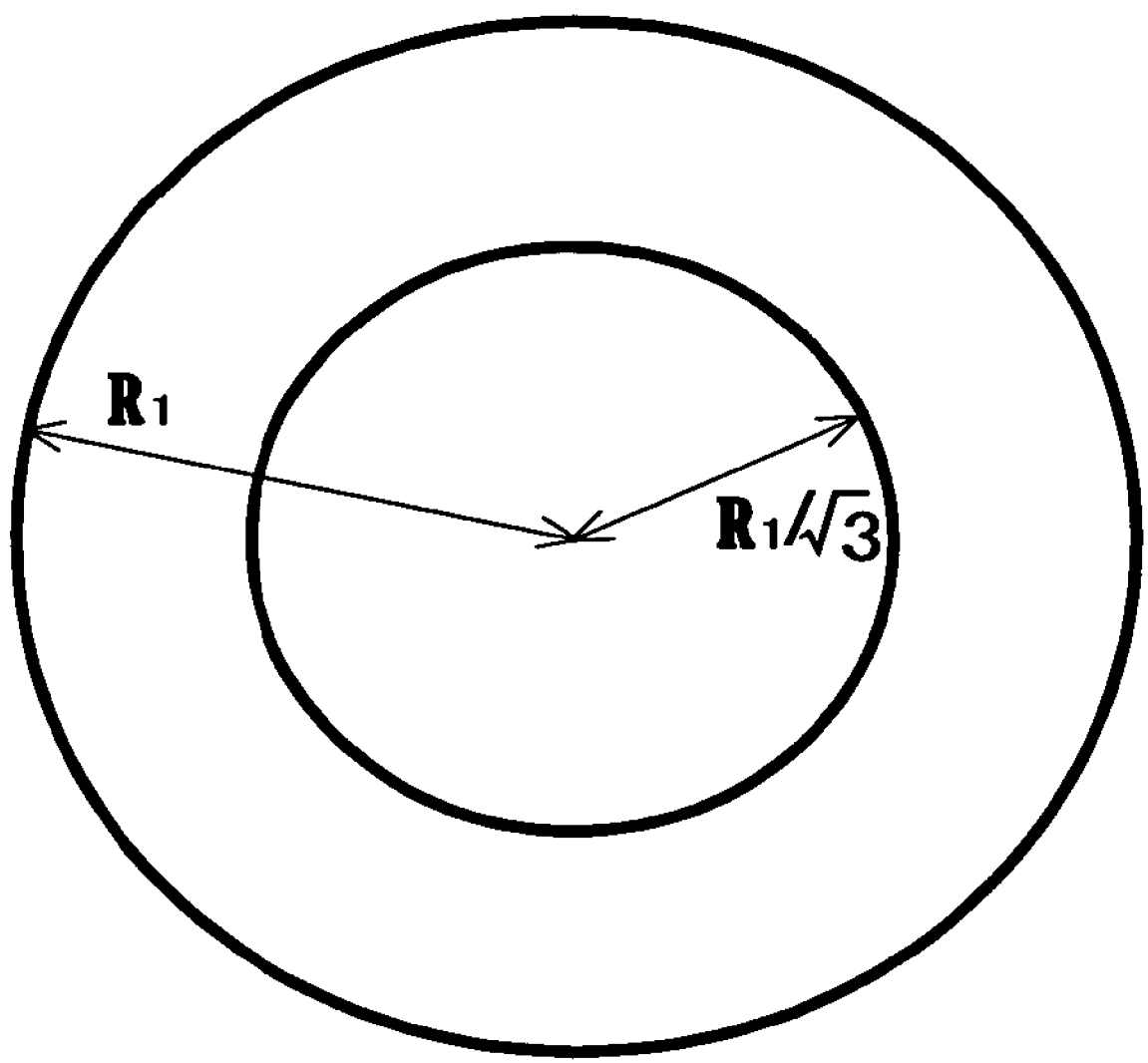
FIG. 5 is a schematically drawn example of ring pattern for the reciprocal lattice for the hexagonal lattice structure.

Experimental results of the present inventors also shows that the magnetic crystalline grain arrangement essentially in an ordered structure of hexagonal lattice is desirable, when the grain diameter control under layer 12a comprises crystalline particles of Pt since the resolution of the recorded signal is improved. FIG. 4 shows a schematically in-plane structure of the hexagonal lattice arrangement. Hexagonal lattice arrangement can be evaluated by methods similar to the case for the tetragonal crystal structure, when patterns as shown in FIG. 4 corresponding to a reciprocal lattice of a hexagonal structure can be recognized. Practically, the arrangement can be confirmed by finding two type periodical spots or rings having a ratio of the distances to the center of $1:1/\sqrt{3}$ ($R_1$ and $R_1/\sqrt{3}$ in FIG. 4).

Figure 6:
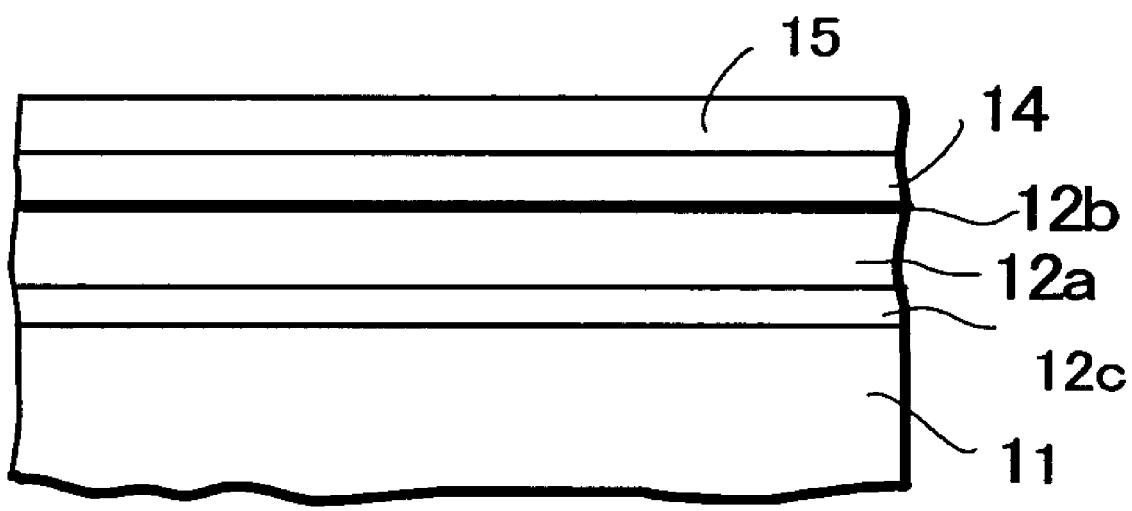
FIG. 6 is a schematically drawn cross section view of a magnetic recording medium comprising an orientation control under-layer according to an embodiment of the present invention.

As shown in FIG. 6, an orientation control under-layer 12c for increasing (100) plane orientation of the crystalline grains in the grain diameter control under-layer 12a can be disposed between the substrate 11 and grain diameter control under-layer 12a when crystalline grains of the grain diameter control under-layer 12a is Cu, Rh, or Ni. As the practical material for orientation control under-layer 12c, at least one selected from the group consisting essentially of NiAl, MnAl, MgO, NiO, TiN, Si, and Ge can be used. The orientation control under-layer 12c need not be disposed directly adjacent to the grain diameter control under-layer 12a.

For the magnetic recording medium of the present invention, a magnetic recording layer 14 having a granular structure is desirable. The formation of nonmagnetic grain boundary regions of the granular structure in the magnetic recording layer 14 lead to a decrease in the exchange interaction between magnetic crystalline grains, a decrease in width of magnetization transition zone and an increase in recording resolution of recording and reproducing characteristics.

As the materials for the magnetic recording layer 14, disordered alloys such as Co—Cr and Co—Pt, ordered alloys such as Fe—Pt, Co—Pt and Fe—Pd, and multi layered film materials such as Co/Pt and Co/Pd can be desirably used. These alloys and multi-layered film materials have advantages of high thermal fluctuation durability because these materials have high crystalline anisotropy energy. Magnetic properties of these alloy and multi-layered materials can be improved by adding some additive elements such as Cu, B and Cr as necessary.

CoCrPt, CoCrPtB, CoCrPtTa, CoCrPtNd, CoCrPtCu and FePtCu alloys can be cited as more desirable materials for the magnetic recording layer 14.

As the materials for composing grain boundary regions of the granular structure, chemical compounds such as oxides, carbide and nitrides are desirable. These compounds are suitable for composing grain boundary regions because these compounds do not form solid solution with the materials for forming the magnetic crystalline grains described above and these compounds can be separated easily. Compounds such as $SiO_x$, $TiO_x$, $CrO_x$, $AlO_x$, $MgO_x$, $TaO_x$, $SiN_x$, $TiN_x$, $AlN_x$, $TaN_x$ $SiC_x$, $TiC_x$ and $TaC_x$ can be cited as materials for forming the grain boundary regions.

The magnetic recording layer 14 can be double structure or more multi-layer structure, in which either one of the multi-layers is granular.

Figure 7:
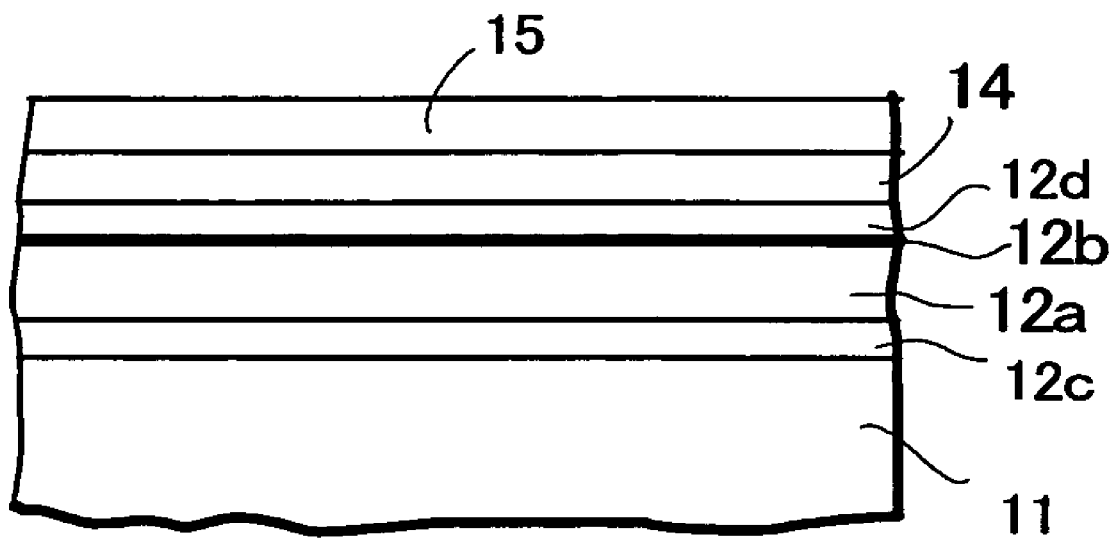
FIG. 7 is a schematically drawn cross section view of a magnetic recording medium having an intermediate under-layer according to an embodiment of the present invention.

As shown in FIG. 7, an intermediate under-layer 12d for controlling characteristics of magnetic recording layer 14 can be disposed as one layer of the set of under-layers 12. The crystal orientation degree can be improved keeping the small average grain diameter and the homogeneity of the diameter by using a granular structured layer as the intermediate under-layer 12d. Furthermore, the recording and reproducing characteristics can be increased.

As the nonmagnetic crystalline materials of the intermediate under-layer 12d showing granular structure, Pt, Pd, Ir, Ag, Cu, Ru, and Rh can be used. These metal materials are desirable because these metal materials show good lattice compatibility with magnetic crystalline grains described above and can improve crystal orientation degree of the magnetic recording layer.

As the materials for forming grain boundary regions of the intermediate under-layer 12d, compounds such as oxides, carbides and nitrides are desirably used. These compounds are advantageous as the materials for composing grain boundary regions because these compounds do not form solid solution with the nonmagnetic crystalline materials for forming the magnetic crystalline grains described above, and can easily be separated. Chemical compounds such as $SiO_x$, $TiO_x$, $CrO_x$, $AlO_x$, $MgO_x$, $TaO_x$, $SiC_x$, $TiC_x$, and $TaC_x$ can be cited for forming the grain boundary regions. The materials constructing the under-layer can include magnetic metal provided that the under-layer is nonmagnetic as the whole.

The intermediate under-layer 12d with a granular structure can be constructed as multi-layer of two or more layers. The layer need not be placed adjacent to the magnetic recording layer.

Figure 8:
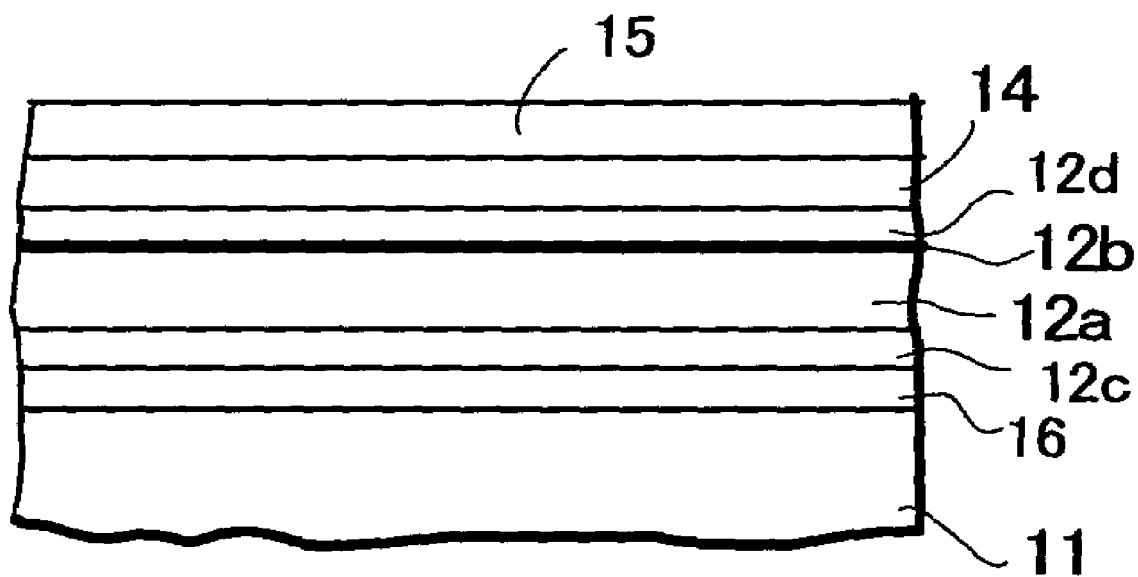
FIG. 8 is a schematically drawn cross section view of a magnetic recording medium having a soft magnetic under-layer according to an embodiment of the present invention.

When the magnetic recording medium of the present invention is applied to a perpendicular magnetic recording medium, a soft magnetic under-layer 16 can be placed between the under-layers and the substrate 11 as shown in FIG. 8.

Disposing the soft magnetic under-layer 16 in the magnetic recording medium described above, so-called perpendicular double-layered medium, comprising the magnetic recording layer 14 disposed on the soft magnetic layer 15, can be constructed. The soft magnetic under-layer 16 shares a partial function of a magnetic head by returning magnetic flux induced by the recording magnetic field from a single pole head passing horizontally through the magnetic recording medium and turning back to the magnetic head. Therefore, the soft magnetic under-layer 16 placed in the magnetic recording medium plays a role for giving a sharp perpendicular magnetic field with sufficient magnitude to the magnetic recording layer 14.

For the soft magnetic under-layer 16, for example, CoZrNb, FeSiAl, FeTaC, CoTaC, NiFe, Fe, FeCoB, FeCoN and FeTaN, can be cited.

Figure 9:
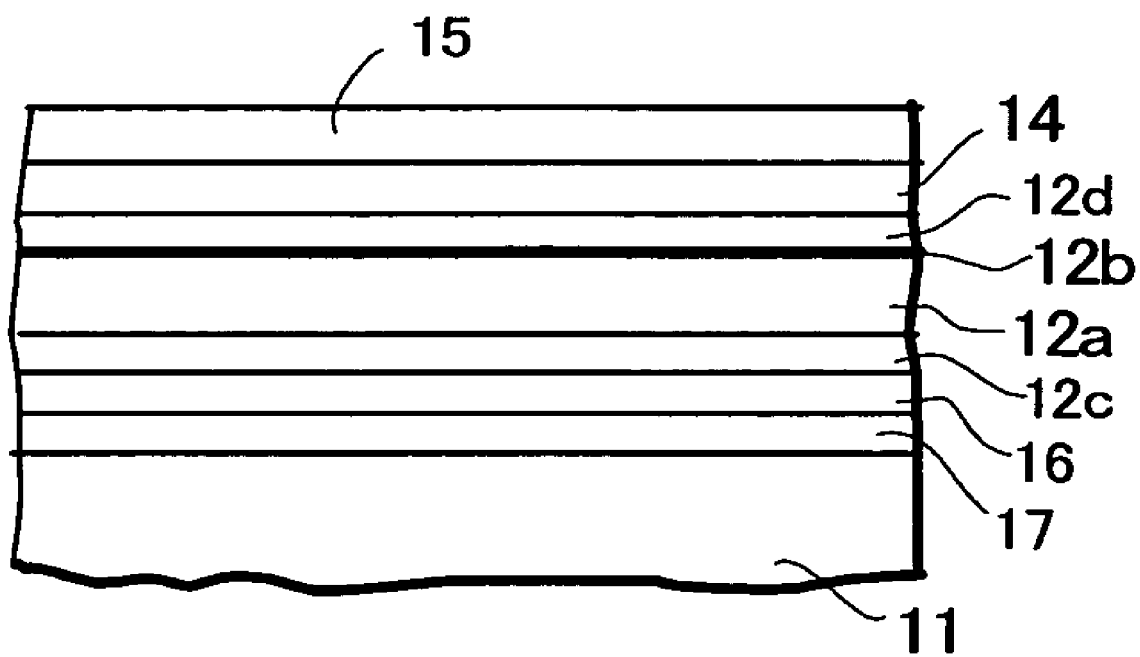
FIG. 9 is a schematically drawn schematically drawn cross section view of a magnetic recording medium having a biasing layer for a soft magnetic under-layer according to an embodiment of the present invention.

A biasing layer 17 can be disposed between the soft magnetic layer 16 and the substrate 11 as shown in FIG. 9. For the biasing layer 17, in-plane hard magnet film, antiferromagnetic film and so on can be applied. Magnetic domains are easily formed in the soft magnetic under-layer 16, and magnetic domain walls induce spike like noise. The formation of magnetic domains can be avoided by applying a magnetic field in one radial direction of the biasing layer 17 and applying biasing field to the soft magnetic under-layer 16 placed on the biasing layer 17. The biasing can be a multi-layered structure with finely dispersed anisotropy field to avoid formation of large magnetic domains. As the material for constructing the biasing layer 17, CoCrPt, CoCrPtB, CoCrPtTa, CoCrPtTaNd, CoSm, CoPt, FePt, CoPtO, CoPtCrO, CoPt—$SiO_2$, CoCrPt—$SiO_2$ and CoCrPtO—$SiO_2$ can be cited.

Glass substrates, Al alloy substrates or Si single crystal substrates with oxide surface, ceramic substrate and plastic substrates can be used for the substrate 11 as nonmagnetic substrates. These inorganic substrates plated with NiP, for example, can be used.

Protective and lubricant layer 15 can be formed on the magnetic recording layer 14. For the protective layer of the protective and lubricant layer 15, carbon or diamond like carbon (DLC) can be used. Other materials $SiN_x$, $SiO_x$, and $CN_x$ can be cited as the protective layer material.

As the method for depositing each layer described above, vacuum evaporation method, every kind of sputtering method, molecular beam epitaxy method, ion beam evaporation method, laser abrasion method and chemical vapor deposition method can be used.

Figure 10:
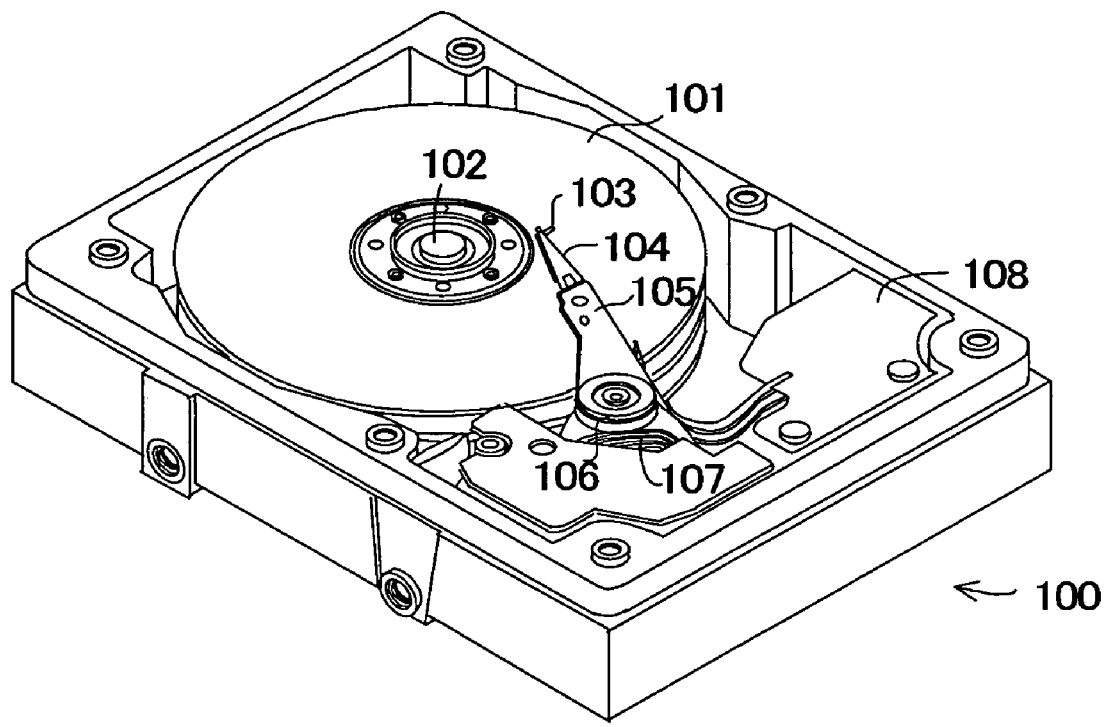
FIG. 10 is a schematically shown oblique view of a magnetic recording apparatus according to an embodiment of the present invention showing the construction by partially removing the covers.

FIG. 10 is oblique view of a magnetic recording apparatus according to an embodiment of the present invention schematically showing the construction by partially removing covers.

In FIG. 10, the magnetic disk 101 according to the present invention is attached to the spindle 102, and is driven at a constant rotating speed by a spindle motor not shown in the Figure. The slider 103 having a recording head for recording information and a MR head and reproducing the recorded information accessing to the surface of the magnetic disk 101 is attached at the top of a suspension 104 constructed by a thin plate shaped flat spring. The suspension 104 is connected to one side of an arm 105 having a bobbin holding a drive coil not shown in the Figure.

At the other side of the arm 105, a voice coil motor 106, a kind of linear motor, is disposed. The voice coil motor 106 is constructed by a magnetic circuit composed of a drive coil rolled up to a bobbin of arm 105, permanent magnet and opposing yokes.

The arm 105 is supported by a ball bearing not shown in the Figure fixed at the upper and lower sides of fixed axis 107, and is driven to swing circularly by the voice coil motor 106. The voice coil motor 106 controls the position of the slider 103 on the magnetic disk 101. In the FIG. 10, a cover 108 is shown partially.

Hereinafter, examples of the present invention will be described to explain the present invention further in detail.

EXAMPLE 1

Nonmagnetic 2.5 inches glass substrates were put into a vacuum chamber of an ANELVA Co. c-301 type sputtering apparatus. The vacuum chambers of the sputtering apparatus were evacuated to $1 \times 10^{-6}$ Pa or less.

Then substrates were heated using an infrared heater up to about 300° C. Keeping the substrate temperature to about 300° C., about 200 nm CoZrNb film was deposited as a soft magnetic under-layer, and then an about 30 nm Ni film was deposited to each substrate.

Each substrate was then elevated to about 500° C., and exposed to oxide or ethylene atmosphere in a range of $1 \times 10^{-5}$ to $1 \times 10^{-2}$ Pa. After the oxide or ethylene exposure, a 5 nm thick $Fe_{50}Pt_{50}$ film was deposited as a magnetic recording layer.

Then a 5 nm carbon film was deposited. For the deposition of CoZrNb, Ni, $Fe_{50}Pt_{50}$ and C films, the Ar gas pressure was controlled to 0.7 Pa, 0,7 Pa, 5 Pa and 0.7 Pa, respectively, and as the target material, CoZrNb, Ni, $Fe_{50}Pt_{50}$, and C, respectively was used. DC sputtering was used for the sputtering deposition. Power inputted to the targets was fixed to 1,000 W for CoZrNb, $Fe_{50}Pt_{50}$ and C deposition, and varied from in a range from 100 to 1,000 W for Ni deposition.

Samples were prepared using the similar deposition procedure except that the Ni described above was replaced by Cu, Rh, Ni and Pt. Furthermore, magnetic recording medium samples having $Co_{50}Pt_{50}$, $Fe_{50}Pd_{50}$ and $Co_{70}Cr_{10}Pt_{10}$ instead of $Fe_{50}Pt_{50}$ as the magnetic recording layers were fabricated using similar procedure described above. Quantity of deposited oxygen or carbon was controlled by the partial pressure of oxygen or ethylene exposure atmosphere. The crystalline grain diameter of the Cu, Rh, Ni and Pt was varied changing input power to the targets.

After finishing these deposition, protective layer of each prepared samples was coated with about 1.3 nm thick lubricant of perfluoropolyether (PFPE) by a dipping method and magnetic recording medium samples were obtained.

As Comparative Example 1, conventional perpendicular magnetic recording medium samples were fabricated by the following procedure. Nonmagnetic 2.5 inches glass substrates were put into the vacuum chambers of the sputtering apparatus and the vacuum chambers were evacuated to $1 \times 10^{-6}$ Pa or less. After heating the substrates using an infrared heater up to about 300° C., 200 nm CoZrNb film as a soft magnetic under-layer, 10 nm Ta film as a seed layer, 20 nm Ru film as a under-layer, 15 nm $Co_{65}$—$Cr_{20}$—$Pt_{14}$—$Ta_1$ layer as a magnetic recording layer, and a 5 nm protective layer were deposited to each substrate, and then the lubricant was coated similar to the example described above.

For depositing CoZrNb film, Ta film, Ru film and CoCrPtTa film, the Ar gas pressure was 0.7 Pa, 0,7 Pa, 0.7 Pa, 5 Pa and 0.7 Pa, respectively, and target material was CoZrNb, Ta, Ru and $Co_{65}Cr_{20}Pt_{14}Ta_1$, respectively. DC sputtering was used for these deposition. Power inputted to the targets was fixed to 1,000 W.

The microstructure, the crystalline grain diameters and the grain size distribution of each fabricated sample were evaluated by a transmission electron microscope (TEM) with accelerating voltage of 400 kV. The quantity of oxygen and carbon atoms deposited on the each film and its distribution toward the depth direction was obtained, using a method similar to the method described in Japanese Patent Laid-open Application 2003-338029, from NRA reaction spectra of each reaction of $^{16}(d,p)^{17}O$, $^{18}O(p,\alpha a)^{15}N$, and $^{12}C(d,p)^{13}C$ by synchrotron irradiation of hydrogen ions or deuteron ions to the oxygen and carbon atoms of the samples. The analysis was preformed also by SIMS method using $Cs^+$.

Recording and reproducing characteristics (read write characteristics, R/W characteristics) of each magnetic recording medium was evaluated by using a spin stand. The magnetic head applied was a combination of a 0.3 μm track width single pole head and a 0.2 μm track width MR head. The same measuring condition at a constant magnetic head position of 20 mm from the disk center and the magnetic disk rotating speed of 4,200 rpm was applied.

Signal to noise ratio for derivative waveforms as an output of a derivative circuit ($SNR_m$) was measured and characterized as the SNR of the magnetic recording medium. The measured signal S was output for linear recording density of 119 kfci, and the measured noise was root mean square value at 716 kfci. In addition, the half width of the derivative waveforms ($dPW_{50}$) was evaluated to obtain as an index for the resolution of the recording.

Table 1 shows the average crystalline grain diameter $d_{Mag}$ and the standard deviation σ of the magnetic layer of each magnetic recording medium.

TABLE 1

| Example | Atoms Deposited Layer | Diameter Control Under-layer | Magnetic Recording layer | $d_{Mag}$ (nm) | σ (nm) |
|---|---|---|---|---|---|
| Example 1-1 | Oxygen | Cu | FePt | 5.0 | 1.3 |
| Example 1-2 | Oxygen | Cu | CoCrPt | 4.9 | 1.3 |
| Example 1-3 | Oxygen | Cu | CoPt | 5.4 | 1.5 |
| Example 1-4 | Oxygen | Cu | FePd | 5.4 | 1.2 |
| Example 1-5 | Carbon | Cu | FePt | 4.9 | 1.3 |
| Example 1-6 | Carbon | Cu | CoCrPt | 5.0 | 1.5 |
| Example 1-7 | Carbon | Cu | CoPt | 5.5 | 1.2 |
| Example 1-8 | Carbon | Cu | FePd | 5.3 | 1.3 |
| Example 1-9 | Oxygen | Ni | FePt | 5.0 | 1.4 |
| Example 1-10 | Oxygen | Ni | CoCrPt | 4.8 | 1.1 |
| Example 1-11 | Oxygen | Ni | CoPt | 5.1 | 1.2 |
| Example 1-12 | Oxygen | Ni | FePd | 5.4 | 1.2 |
| Example 1-13 | Carbon | Ni | FePt | 5.0 | 1.4 |
| Example 1-14 | Carbon | Ni | CoCrPt | 5.1 | 1.3 |
| Example 1-15 | Carbon | Ni | CoPt | 5.3 | 1.4 |
| Example 1-16 | Carbon | Ni | FePd | 5.1 | 1.0 |
| Example 1-17 | Oxygen | Rh | FePt | 5.1 | 1.1 |
| Example 1-18 | Oxygen | Rh | CoCrPt | 4.9 | 1.3 |
| Example 1-19 | Oxygen | Rh | CoPt | 5.4 | 1.5 |
| Example 1-20 | Oxygen | Rh | FePd | 5.3 | 1.4 |
| Example 1-21 | Carbon | Rh | FePt | 4.9 | 1.4 |
| Example 1-22 | Carbon | Rh | CoCrPt | 5.0 | 1.5 |
| Example 1-23 | Carbon | Rh | CoPt | 5.2 | 1.3 |
| Example 1-24 | Carbon | Rh | FePd | 5.2 | 1.1 |
| Example 1-25 | Oxygen | Pt | FePt | 5.1 | 1.1 |
| Example 1-26 | Oxygen | Pt | CoCrPt | 5.1 | 1.2 |
| Example 1-27 | Oxygen | Pt | CoPt | 5.3 | 1.0 |
| Example 1-28 | Oxygen | Pt | FePd | 5.2 | 1.4 |
| Example 1-29 | Carbon | Pt | FePt | 5.5 | 1.4 |
| Example 1-30 | Carbon | Pt | CoCrPt | 5.3 | 1.0 |
| Example 1-31 | Carbon | Pt | CoPt | 5.6 | 1.1 |

TABLE 1-continued

| Example | Atoms Deposited Layer | Diameter Control Under-layer | Magnetic Recording layer | $d_{Mag}$ (nm) | σ (nm) |
|---|---|---|---|---|---|
| Example 1-32 | Carbon | Pt | FePd | 5.8 | 1.5 |
| Comparative Example | | | (conventional medium) | 7.1 | 2.5 |

As shown in Table 1, each magnetic recording medium of the Example 1 has smaller average crystalline grain diameter with smaller standard deviation compared with the magnetic recording medium of the Comparative Example 1.

Figure 11:
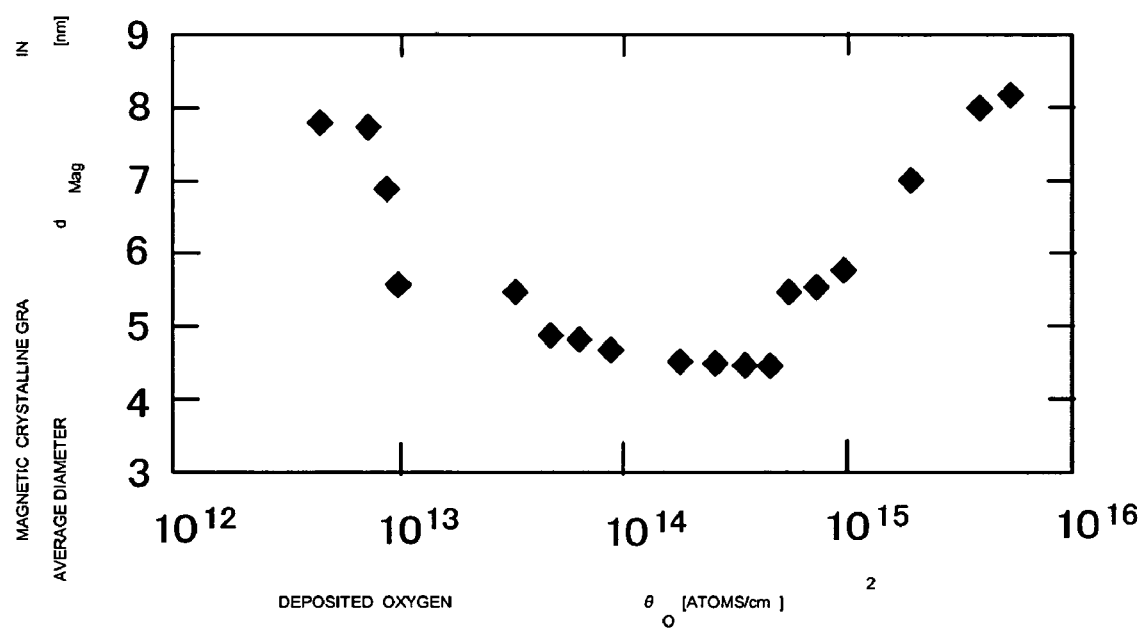
FIG. 11 is a graph showing the relation between the quantity of deposited oxygen atoms and the average grain diameter of the magnetic recording layer of Example 1.
Figure 12:
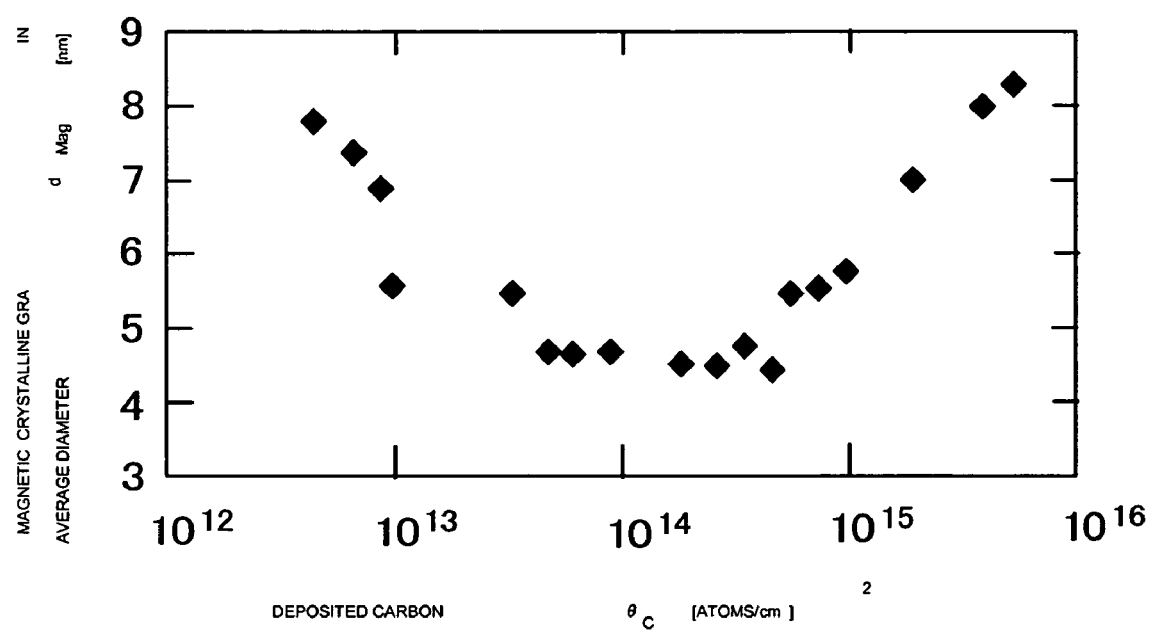
FIG. 12 is a graph showing the relation between the quantity of deposited carbon atoms and the average grain diameter of the magnetic recording layer of Example 1.

FIG. 11 and FIG. 12 shows a relationship between the quantity of deposited oxygen $\theta_o$ and carbon $\theta_c$, respectively, and the average magnetic crystalline grain diameter $d_{Mag}$ obtained by a nuclear reaction analysis NRA for $Fe_{50}Pt_{50}$ magnetic layer and Ni diameter control under-layer samples. From this Figure, it can be found that when the θ value is in a range from $1\times10^{13}$ atom/cm$^2$ to $1\times10^{15}$ atom/cm$^2$, the crystalline grains were significantly small and desirable. Similar results were obtained for the cases of Cu, Rh, and Pt diameter control under-layer samples. Similar results were also obtained for the cases of $Co_{50}Pt_{50}$, $Fe_{50}Pd_{50}$ and $Co_{70}Cr_{10}Pt_{20}$ magnetic layer. For each magnetic recording medium, the fact that deposited oxygen and carbon atoms were found on diameter control under-layer surface region and not exist insides of the diameter control under-layers was confirmed by a chemical element distribution measurement using SIMS toward the depth direction.

Figure 13:
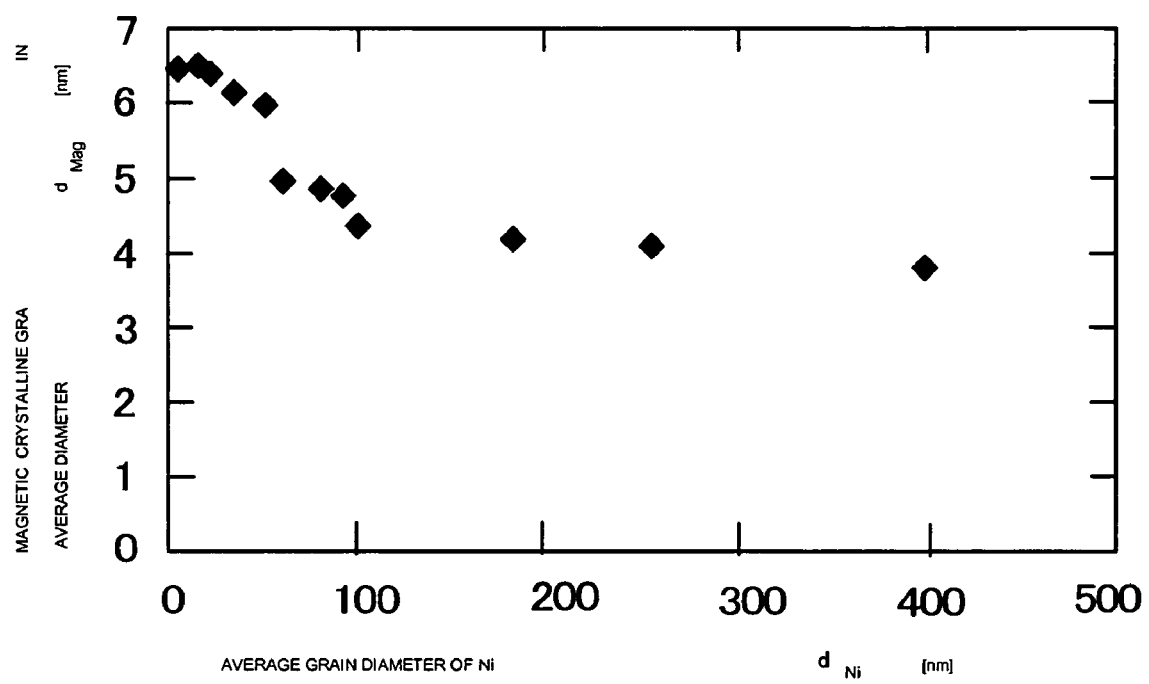
FIG. 13 is a graph showing the relation between the average diameter of Ni and the average grain diameter of the magnetic recording layer of Example 1.
Figure 14:
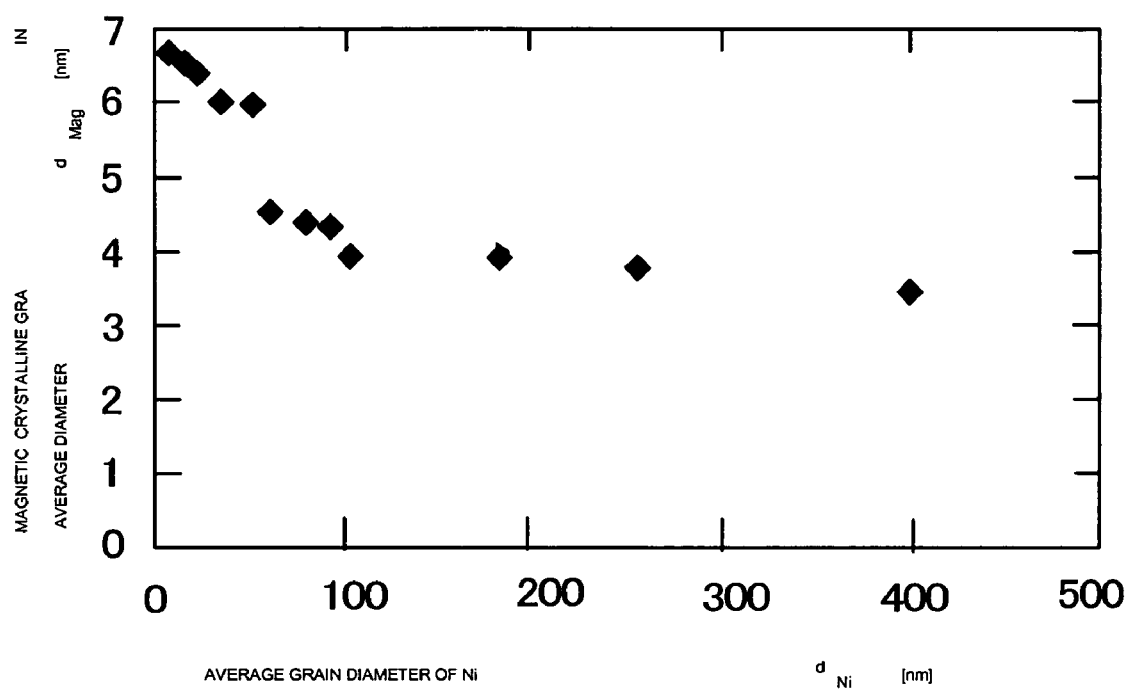
FIG. 14 is a graph showing the relation between the average diameter of Ni and the average grain diameter of the magnetic recording layer of Example 1.

FIG. 13 and FIG. 14 show a relationship between the average diameter of Ni crystalline grains $d_{Ni}$ at Ni layer and the average diameter of magnetic crystalline grains $d_{Mag}$ for $Fe_{50}Pd_{50}$ magnetic layers for $2\times10^{14}$ atom/cm$^2$ and $4\times10^{14}$ atom/cm$^2$ deposited oxygen or carbon. The average grain diameter of the magnetic layer became significantly small when the average grain diameter of Ni layer is 50 nm or larger than 50 nm. Similar result was obtained for samples for Cu, Rh, and Pt grain diameter control under-layer.

Figure 15:
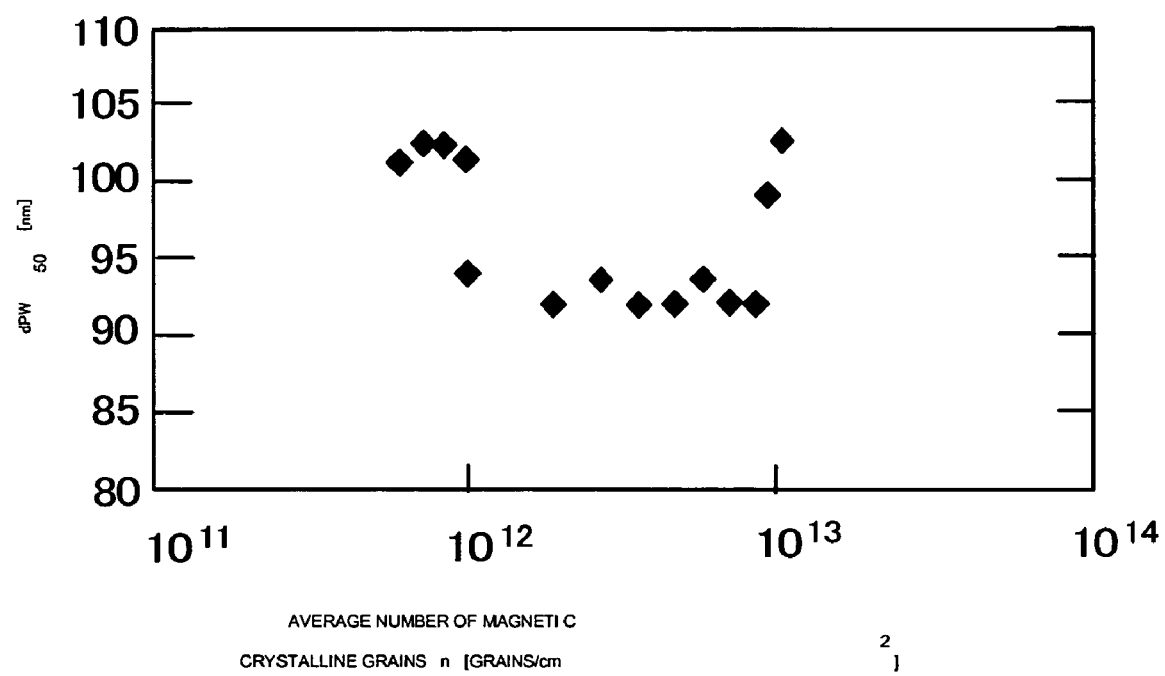
FIG. 15 is a graph showing the relation between the areal density of magnetic crystalline grains and the $dPW_{50}$ of the magnetic recording layer of Example 1.
Figure 16:
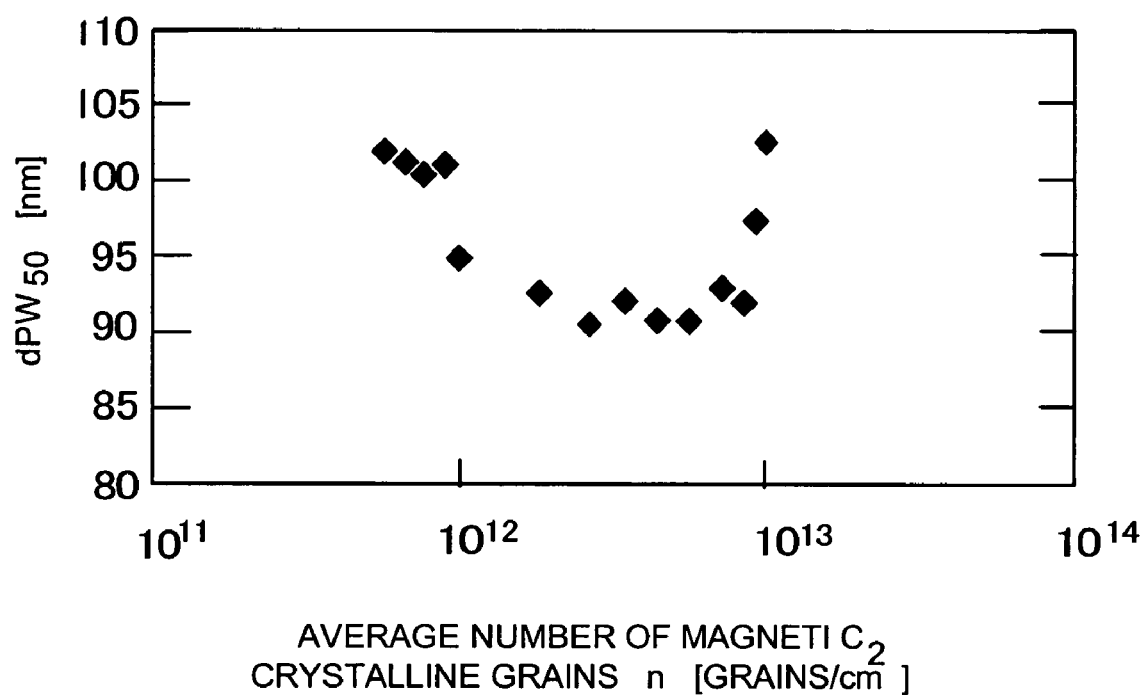
FIG. 16 is a graph showing the relation between the areal density of magnetic crystalline grains and the $dPW_{50}$ of the magnetic recording layer of Example 1.

FIG. 15 and FIG. 16 shows $dPW_{50}$ plotted as a function of average areal density of magnetic crystalline grains n in each magnetic recording layer obtained by TEM observation for $d_{Ni}$ of 100 nm and for areal density of oxygen or carbon deposition of $2\times10^{14}$ atom/cm$^2$ and of $4\times10^{14}$ atom/cm$^2$, respectively. When n is in a range from $1\times10^{12}$ grains /cm$^2$ to $8\times10^{12}$ grains /cm$^2$, $dPW_{50}$ decreases desirably. When n is in a range from $1\times10^{12}$ grains/cm$^2$ to $8\times10^{12}$ grains/cm$^2$, plural number of magnetic crystalline particles in the magnetic recording layer on one Ni crystalline grain on average was confirmed. Similar result was obtained for samples for Cu, Rh, and Pt grain diameter control under-layer.

Ordered arrangement of magnetic crystalline grains was examined for magnetic recording layer in-plane TEM Figure of each magnetic recording medium using an image processing and analyzing software "Image-Pro Plus" (Media Cybernetics Co., USA). In-plane TEM Figure for each magnetic recording layer was transformed into patterns expressed by two values increasing contrast between regions of magnetic grains and other regions and the pattern was transformed into a reciprocal lattice pattern by FFT and evaluated. As the result, no ordered arrangement could be found for conventional medium sample of Comparative Example 1.

On the other hand, every magnetic recording medium having n values in a range from $1\times10^{12}$ gains/cm$^2$ to $8\times0^{12}$ gains/cm$^2$, and having Ni, Rh and Cu grain diameter control under-layer, showed granular structured magnetic recording layer. FFT analysis for TEM Figure confirmed essentially tetragonal arrangement of crystalline particles two periodical pattern showing $1:1/\sqrt{2}$ relationship in distances from the center spot.

For every magnetic recording medium having Pt grain diameter control under-layer showed granular structured magnetic recording layer. FFT analysis for TEM Figure confirmed essentially hexgonal arrangement of crystalline particles two periodical pattern showing $1:1/\sqrt{3}$ relationship in distances from the center spot.

EXAMPLE 2

Nonmagnetic 2.5 inches glass substrates were put into the vacuum chambers and the vacuum chambers were evacuated to $1\times10^{-6}$ Pa or less. Then CoZrNb soft under-layer, Cu, Ni, Rh and Pt films were deposited respectively, using the method described in Example 1.

Oxygen deposited layer was formed irradiating oxygen ions at 200 eV using ion gun on the under-layer surface in oxygen atmosphere in a range from $1\times10^{-5}$ Pa to $1\times10^{-2}$ Pa. Then magnetic recording layer of a 5 nm $Co_{70}Cr_{10}Pt_{20}$–TiN was formed using $Co_{70}Cr_{10}Pt_{20}$-10 mol % TiN composite target. Magnetic recording layers replacing $Co_{70}Cr_{10}Pt_{20}$ by $Fe_{50}$—$Pt_{50}$, $Co_{50}Pt_{50}$ and $Co_{50}Pd_{50}$, and replacing TiN by AlN, TaN, TiC and TaC were deposited respectively. Using similar procedure as described in Example 1, carbon protective layer was deposited and lubricant layer was coated. Then, various magnetic recording media were prepared.

Table 2A and 2B show $SNR_m$ values and $dPW_{50}$ values for each magnetic recording medium. Magnetic recording layer structure composite with chemical compound leads desirably increased magnetic recording medium $SNR_m$. Every composite magnetic recording layer including chemical compound showed granular structure, and magnetic crystalline grains on Ni, Rh, and Cu grain diameter control under-layer showed ordered structure arranged to form tetragonal lattice. On the other hand, magnetic crystalline grains on Pt grain diameter control under-layer showed ordered structure arranged to form hexagonal lattice.

TABLE 2A

| Example | Diameter Control Under-layer | Magnetic Recording Under-layer | $SNR_m$ (dB) | $dPW_{50}$ (nm) |
|---|---|---|---|---|
| Example 2-1 | Cu | CoCrPt | 16.0 | 92 |
| Example 2-2 | Cu | CoCrPt—TiN | 16.5 | 85 |
| Example 2-3 | Cu | CoCrPt—AlN | 16.3 | 85 |
| Example 2-4 | Cu | CoCrPt—TaN | 16.4 | 84 |
| Example 2-5 | Cu | CoCrPt—$Si_3N_4$ | 16.5 | 85 |
| Example 2-6 | Cu | CoCrPt—TiC | 16.3 | 83 |
| Example 2-7 | Cu | CoCrPt—TaC | 16.3 | 83 |
| Example 2-8 | Ni | CoCrPt—TiN | 16.7 | 83 |
| Example 2-9 | Ni | CoCrPt—AlN | 16.8 | 85 |
| Example 2-10 | Ni | CoCrPt—TaN | 16.9 | 82 |
| Example 2-11 | Ni | CoCrPt—$Si_3N_4$ | 16.9 | 86 |
| Example 2-12 | Ni | CoCrPt—TiC | 16.7 | 82 |
| Example 2-13 | Ni | CoCrPt—TaC | 16.6 | 83 |
| Example 2-14 | Rh | CoCrPt—TiN | 16.3 | 84 |
| Example 2-15 | Rh | CoCrPt—AlN | 16.4 | 85 |
| Example 2-16 | Rh | CoCrPt—TaN | 16.4 | 84 |
| Example 2-17 | Rh | CoCrPt—$Si_3N_4$ | 16.3 | 83 |
| Example 2-18 | Rh | CoCrPt—TiC | 16.4 | 82 |
| Example 2-19 | Rh | CoCrPt—TaC | 16.4 | 82 |
| Example 2-20 | Pt | CoCrPt—TiN | 16.4 | 84 |
| Example 2-21 | Pt | CoCrPt—AlN | 16.3 | 86 |
| Example 2-22 | Pt | CoCrPt—TaN | 16.6 | 86 |
| Example 2-23 | Pt | CoCrPt—$Si_3N_4$ | 16.6 | 83 |
| Example 2-24 | Pt | CoCrPt—TiC | 16.5 | 82 |
| Example 2-25 | Pt | CoCrPt—TaC | 16.6 | 85 |

TABLE 2B

| Example | Diameter Control Under-layer | Magnetic Recording Under-layer | $SNR_m$ (dB) | $dPW_{50}$ (nm) |
|---|---|---|---|---|
| Example 2-26 | Cu | FePt | 15.9 | 90 |
| Example 2-27 | Cu | FePt—TiN | 16.4 | 84 |
| Example 2-28 | Cu | FePt—AlN | 16.4 | 82 |
| Example 2-29 | Cu | FePt—TaN | 16.3 | 85 |
| Example 2-30 | Cu | FePt—$Si_3N_4$ | 16.7 | 84 |
| Example 2-31 | Cu | FePt—TiC | 16.7 | 85 |
| Example 2-32 | Cu | FePt—TaC | 16.5 | 83 |
| Example 2-33 | Ni | FePt—TiN | 16.5 | 82 |
| Example 2-34 | Ni | FePt—AlN | 16.7 | 84 |
| Example 2-35 | Ni | FePt—TaN | 16.3 | 84 |
| Example 2-36 | Ni | FePt—$Si_3N_4$ | 16.2 | 85 |
| Example 2-37 | Ni | FePt—TiC | 16.1 | 82 |
| Example 2-38 | Ni | FePt—TaC | 16.4 | 83 |
| Example 2-39 | Rh | FePt—TiN | 16.3 | 83 |
| Example 2-40 | Rh | FePt—AlN | 16.3 | 82 |
| Example 2-41 | Rh | FePt—TaN | 16.4 | 83 |
| Example 2-42 | Rh | FePt—$Si_3N_4$ | 16.6 | 84 |
| Example 2-43 | Rh | FePt—TiC | 16.7 | 83 |
| Example 2-44 | Rh | FePt—TaC | 16.3 | 83 |
| Example 2-45 | Pt | FePt—TiN | 16.3 | 83 |
| Example 2-46 | Pt | FePt—AlN | 16.5 | 84 |
| Example 2-47 | Pt | FePt—TaN | 16.2 | 85 |
| Example 2-48 | Pt | FePt—$Si_3N_4$ | 16.4 | 84 |
| Comparative Example | | (conventional medium) | 15.4 | 109 |

EXAMPLE 3

Nonmagnetic 2.5 inches glass substrates were put into the vacuum chambers and the vacuum chambers were evacuated to $2\times10^{-6}$ Pa or less. Then on the CoZrNb soft under-layer, Cu, Ni, Rh or Pt film was deposited, and then deposited carbon layer was formed using the method described in example 1 to each substrate. Magnetic recording layer of a 5 nm $Co_{70}Cr_{10}Pt_{20}$—$SiO_2$ was formed using 5 nm $Co_{70}Cr_{10}Pt_{20}$-10 mol % $SiO_2$ composite target. Magnetic recording layers replacing $Co_{70}Cr_{10}Pt_{20}$ by $Fe_{50}$—$Pt_{50}$, $Co_{50}Pt_{50}$ and $Fe_{50}Pd_{50}$, and replacing $SiO_2$ by TiO, $Al_2O_3$, TiN, AlN, and TaN, were deposited respectively. Using similar procedure described in Example 1, carbon protective layer was deposited and lubricant layer was coated. Then, various magnetic recording media were prepared.

Table 3A and 3B show $SNR_m$ values and $dPW_{50}$ values for each magnetic recording medium. Magnetic recording layer structure composite with chemical compound leads desirably increased magnetic recording medium $SNR_m$. Every composite magnetic recording layer including chemical compound showed granular structure, and magnetic crystalline grains on Ni, Rh, and Cu grain diameter control under-layer showed ordered structure arranged to form tetragonal lattice. On the other hand, magnetic crystalline grains on Pt grain diameter control under-layer showed ordered structure arranged to form hexagonal lattice.

TABLE 3A

| Example | Diameter Control Under-layer | Magnetic Recording Under-layer | $SNR_m$ (dB) | $dPW_{50}$ (nm) |
|---|---|---|---|---|
| Example 3-1 | Cu | CoCrPt | 16.1 | 93 |
| Example 3-2 | Cu | CoCrPt—TiN | 16.5 | 86 |
| Example 3-3 | Cu | CoCrPt—AlN | 16.6 | 84 |
| Example 3-4 | Cu | CoCrPt—TaN | 16.4 | 81 |
| Example 3-5 | Cu | CoCrPt—$Si_3N_4$ | 16.6 | 85 |

TABLE 3A-continued

| Example | Diameter Control Under-layer | Magnetic Recording Under-layer | $SNR_m$ (dB) | $dPW_{50}$ (nm) |
|---|---|---|---|---|
| Example 3-6 | Cu | CoCrPt—TiC | 16.5 | 81 |
| Example 3-7 | Cu | CoCrPt—TaC | 16.3 | 81 |
| Example 3-8 | Ni | CoCrPt—TiN | 16.8 | 84 |
| Example 3-9 | Ni | CoCrPt—AlN | 16.7 | 83 |
| Example 3-10 | Ni | CoCrPt—TaN | 16.9 | 84 |
| Example 3-11 | Ni | CoCrPt—$Si_3N_4$ | 16.6 | 82 |
| Example 3-12 | Ni | CoCrPt—TiC | 16.5 | 85 |
| Example 3-13 | Ni | CoCrPt—TaC | 16.9 | 85 |
| Example 3-14 | Rh | CoCrPt—TiN | 16.6 | 87 |
| Example 3-15 | Rh | CoCrPt—AlN | 16.5 | 83 |
| Example 3-16 | Rh | CoCrPt—TaN | 16.5 | 81 |
| Example 3-17 | Rh | CoCrPt—$Si_3N_4$ | 16.6 | 84 |
| Example 3-18 | Rh | CoCrPt—TiC | 16.3 | 80 |
| Example 3-19 | Rh | CoCrPt—TaC | 16.4 | 83 |
| Example 3-20 | Pt | CoCrPt—TiN | 16.4 | 83 |
| Example 3-21 | Pt | CoCrPt—AlN | 16.5 | 81 |
| Example 3-22 | Pt | CoCrPt—TaN | 16.3 | 80 |
| Example 3-23 | Pt | CoCrPt—$Si_3N_4$ | 16.4 | 81 |
| Example 3-24 | Pt | CoCrPt—TiC | 16.5 | 83 |
| Example 3-25 | Pt | CoCrPt—TaC | 16.5 | 82 |

TABLE 3B

| Example | Diameter Control Under-layer | Magnetic Recording Under-layer | $SNR_m$ (dB) | $dPW_{50}$ (nm) |
|---|---|---|---|---|
| Example 3-26 | Cu | FePt | 16.0 | 91 |
| Example 3-27 | Cu | FePt—TiN | 16.4 | 84 |
| Example 3-28 | Cu | FePt—AlN | 16.5 | 85 |
| Example 3-29 | Cu | FePt—TaN | 16.3 | 83 |
| Example 3-30 | Cu | FePt—$Si_3N_4$ | 16.4 | 86 |
| Example 3-31 | Cu | FePt—TiC | 16.3 | 82 |
| Example 3-32 | Cu | FePt—TaC | 16.5 | 84 |
| Example 3-33 | Ni | FePt—TiN | 16.3 | 83 |
| Example 3-34 | Ni | FePt—AlN | 16.7 | 80 |
| Example 3-35 | Ni | FePt—TaN | 16.8 | 81 |
| Example 3-36 | Ni | FePt—$Si_3N_4$ | 16.3 | 84 |
| Example 3-37 | Ni | FePt—TiC | 16.5 | 83 |
| Example 3-38 | Ni | FePt—TaC | 16.4 | 82 |
| Example 3-39 | Rh | FePt—TiN | 16.3 | 82 |
| Example 3-40 | Rh | FePt—AlN | 16.4 | 82 |
| Example 3-41 | Rh | FePt—TaN | 16.3 | 81 |
| Example 3-42 | Rh | FePt—$Si_3N_4$ | 16.5 | 83 |
| Example 3-43 | Rh | FePt—TiC | 16.4 | 81 |
| Example 3-44 | Rh | FePt—TaC | 16.3 | 82 |
| Example 3-45 | Pt | FePt—TiN | 16.5 | 83 |
| Example 3-46 | Pt | FePt—AlN | 16.7 | 84 |
| Example 3-47 | Pt | FePt—TaN | 16.8 | 84 |
| Example 3-48 | Pt | FePt—$Si_3N_4$ | 16.5 | 82 |
| Example 3-49 | Pt | FePt—TiC | 16.7 | 85 |
| Example 3-50 | Pt | FePt—TaC | 16.4 | 85 |
| Comparative Example | | (Conventional Medium) | 15.4 | 109 |

EXAMPLE 4

2.5 inch hard disk shaped nonmagnetic glass substrates were prepared and film depositions were performed using same process as shown in Example 1 up to oxygen deposition treatment. Then 10 nm Pt—TiN was deposited using a composite target of Pt-10 mol % TiN to each substrate. On the Pt—TiN layer, 5 nm $Co_{70}Cr_{10}Pt_{20}$—$SiO_2$ magnetic recording layer was deposited using $Co_{70}Cr_{10}Pt_{20}$-10% $SiO_2$ composite target.

Then various magnetic recording media were obtained depositing carbon protective layer and coating lubricant layer using the procedure described in Example 2. In addition, various magnetic recording media were prepared from the magnetic recording medium mentioned above replacing under-layer Pt by Pd, Ir, Ag, Cu, Ru and Rh, and replacing TiN by AlN, TaNSi$_2$N$_3$, TiC, and TaC, under-layer, respectively, were fabricated preparing targets for each deposition. Furthermore, magnetic recording layer of Fe$_{50}$—Pt$_{50}$, Co$_{50}$Pt$_{50}$ and Fe$_{50}$Pd$_{50}$ instead of Co$_{70}$Cr$_{10}$Pt$_{20}$SiO$_2$, and TiO, Al$_2$O$_3$, TiN, AlN, TaN, TiC, and TaC instead of SiO$_2$, were deposited respectively, preparing targets for each deposition.

Tables 4A and 4B show SNR$_m$ values and dPW$_{50}$ values for every magnetic recording medium having CoCrPt—SiO$_2$ magnetic recording layer and respective under-layers. Magnetic recording layer structure composite with chemical compound showed increased magnetic recording medium SNR$_m$. Similar result was also found when other magnetic recording layer was applied. Every magnetic recording layer and under layer showed granular structure, and magnetic recording media with Ni, Rh, and Cu grain diameter control under-layer showed essentially ordered structure of magnetic crystalline grains arranged to form tetragonal lattice. On the other hand, magnetic recording media with Pt grain diameter control under-layer showed ordered structure of magnetic crystalline grains arranged to form hexagonal lattice.

TABLE 4A

| Example | Intermediate Under-layer | SNR$_m$ [dB] | dPW$_{50}$ [nm] |
|---|---|---|---|
| Example 4-1 | Pt | 17.3 | 77 |
| Example 4-2 | Pd | 17.3 | 78 |
| Example 4-3 | Ir | 17.2 | 77 |
| Example 4-4 | Ag | 17.2 | 77 |
| Example 4-5 | Cu | 17.2 | 76 |
| Example 4-6 | Ru | 17.4 | 77 |
| Example 4-7 | Rh | 17.4 | 77 |
| Example 4-8 | Pt—TiN | 17.8 | 74 |
| Example 4-9 | Pd—TiN | 17.6 | 75 |
| Example 4-10 | Ir—TiN | 17.8 | 75 |
| Example 4-11 | Ag—TiN | 17.5 | 74 |
| Example 4-12 | Cu—TiN | 17.4 | 74 |
| Example 4-13 | Ru—TiN | 17.7 | 73 |
| Example 4-14 | Rh—TiN | 17.7 | 73 |
| Example 4-15 | Pt—AlN | 17.7 | 75 |
| Example 4-16 | Pd—AlN | 17.7 | 73 |
| Example 4-17 | Ir—AlN | 17.5 | 72 |
| Example 4-18 | Ag—AlN | 17.6 | 72 |
| Example 4-19 | Cu—AlN | 17.6 | 74 |
| Example 4-20 | Ru—AlN | 17.8 | 73 |
| Example 4-21 | Rh—AlN | 17.7 | 73 |
| Example 4-22 | Pt—TaN | 17.8 | 74 |
| Example 4-23 | Pd—TaN | 17.5 | 72 |
| Example 4-24 | Ir—TaN | 17.5 | 73 |
| Example 4-25 | Ag—TaN | 17.6 | 74 |
| Example 4-26 | Cu—TaN | 17.5 | 73 |
| Example 4-27 | Ru—TaN | 17.7 | 73 |
| Example 4-28 | Rh—TaN | 17.6 | 72 |

TABLE 4B

| Example | Intermediate Under-layer | SNR$_m$ [dB] | dPW$_{50}$ [nm] |
|---|---|---|---|
| Example 4-29 | Pt—Si$_3$N$_4$ | 17.9 | 76 |
| Example 4-30 | Pd—Si$_3$N$_4$ | 17.9 | 73 |
| Example 4-31 | Ir—Si$_3$N$_4$ | 17.7 | 74 |
| Example 4-32 | Ag—Si$_3$N$_4$ | 17.7 | 74 |
| Example 4-33 | Cu—Si$_3$N$_4$ | 17.8 | 75 |
| Example 4-34 | Ru—Si$_3$N$_4$ | 17.8 | 75 |
| Example 4-35 | Rh—Si$_3$N$_4$ | 17.6 | 72 |
| Example 4-36 | Pt—TiC | 17.7 | 73 |
| Example 4-37 | Pd—TiC | 17.9 | 73 |
| Example 4-38 | Ir—TiC | 17.6 | 74 |
| Example 4-39 | Ag—TiC | 17.7 | 73 |
| Example 4-40 | Cu—TiC | 17.5 | 72 |
| Example 4-41 | Ru—TiC | 17.8 | 74 |
| Example 4-42 | Rh—TiC | 17.7 | 75 |
| Example 4-43 | Pt—TaC | 17.6 | 75 |
| Example 4-44 | Pd—TaC | 17.8 | 75 |
| Example 4-45 | Ir—TaC | 17.7 | 72 |
| Example 4-46 | Ag—TaC | 17.4 | 73 |
| Example 4-47 | Cu—TaC | 17.3 | 73 |
| Example 4-48 | Ru—TaC | 17.8 | 74 |
| Example 4-49 | Rh—TaC | 17.9 | 72 |
| Comparative Example | (Conventional medium) | 15.4 | 109 |

EXAMPLE 5

2.5 inch hard disk shaped nonmagnetic glass substrates were prepared and film depositions were performed using the same procedure as shown in Example 1 up to carbon deposition treatment. Then 10 nm Pt—SiO$_2$ was deposited using Pt-10 mol % SiO$_2$ composite target. Various magnetic recording medium were fabricated depositing various magnetic recording layer on the Pt—SiO$_2$ layer, depositing carbon protective layer and coating lubricant layer using the same fabricating conditions described in Example 4. Furthermore, various magnetic recording media were obtained replacing the Pt by Pd, Ir, Ag, Cu, Ru and Rh, and replacing the SiO$_2$ by TiO, Al$_2$O$_3$, TiN, AlN, TaN, TiC, and TaC, respectively, preparing and using each respective target.

Tables 5A and 5B show SNR$_m$ values and dPW$_{50}$ values for each magnetic recording medium having CoCrPt—SiO$_2$ magnetic recording layer and respective under-layers. Disposing under-layer composite with chemical compound under the magnetic recording layer showed improvement of magnetic recording medium recording resolution. Similar result was also found when other magnetic recording layer was applied. Every magnetic recording layer and under layer showed granular structure, and magnetic recording media with Ni, Rh, and Cu grain diameter control under-layer showed essentially ordered structure of magnetic crystalline grains arranged to form tetragonal lattice. On the other hand, magnetic recording media with Pt grain diameter control under-layer showed ordered structure of magnetic crystalline grains arranged to form hexagonal lattice.

TABLE 5A

| Example | Intermediate Unde-layer | SNR$_m$ [dB] | dPW$_{50}$ [nm] |
|---|---|---|---|
| Example 5-1 | Pt | 17.3 | 78 |
| Example 5-2 | Pd | 17.3 | 77 |
| Example 5-3 | Ir | 17.2 | 78 |
| Example 5-4 | Ag | 17.3 | 79 |
| Example 5-5 | Cu | 17.0 | 77 |
| Example 5-6 | Ru | 17.3 | 77 |
| Example 5-7 | Rh | 17.1 | 78 |
| Example 5-8 | Pt—TiN | 17.7 | 75 |
| Example 5-9 | Pd—TiN | 17.6 | 74 |
| Example 5-10 | Ir—TiN | 17.6 | 73 |
| Example 5-11 | Ag—TiN | 17.7 | 75 |
| Example 5-12 | Cu—TiN | 17.6 | 74 |
| Example 5-13 | Ru—TiN | 17.8 | 72 |
| Example 5-14 | Rh—TiN | 17.8 | 75 |
| Example 5-15 | Pt—AlN | 17.8 | 75 |
| Example 5-16 | Pd—AlN | 17.7 | 72 |
| Example 5-17 | Ir—AlN | 17.9 | 73 |
| Example 5-18 | Ag—AlN | 17.6 | 74 |

TABLE 5A-continued

| Example | Intermediate Unde-layer | SNR$_m$ [dB] | dPW$_{50}$ [nm] |
| --- | --- | --- | --- |
| Example 5-19 | Cu—AlN | 17.8 | 72 |
| Example 5-20 | Ru—AlN | 17.9 | 75 |
| Example 5-21 | Rh—AlN | 17.9 | 73 |
| Example 5-22 | Pt—TaN | 17.7 | 74 |
| Example 5-23 | Pd—TaN | 17.6 | 73 |
| Example 5-24 | Ir—TaN | 17.7 | 74 |
| Example 5-25 | Ag—TaN | 17.6 | 73 |
| Example 5-26 | Cu—TaN | 17.7 | 74 |
| Example 5-27 | Ru—TaN | 17.9 | 73 |
| Example 5-28 | Rh—TaN | 17.6 | 73 |

TABLE 5B

| Example | Intermediae Under-layer | SNR$_m$ [dB] | dPW$_{50}$ [nm] |
| --- | --- | --- | --- |
| Example 5-29 | Pt—Si$_3$N$_4$ | 17.8 | 74 |
| Example 5-30 | Pd—Si$_3$N$_4$ | 17.9 | 72 |
| Example 5-31 | Ir—Si$_3$N$_4$ | 17.7 | 71 |
| Example 5-32 | Ag—Si$_3$N$_4$ | 17.8 | 71 |
| Example 5-33 | Cu—Si$_3$N$_4$ | 17.6 | 73 |
| Example 5-34 | Ru—Si$_3$N$_4$ | 17.8 | 74 |
| Example 5-35 | Rh—Si$_3$N$_4$ | 17.9 | 75 |
| Example 5-36 | Pt—TiC | 17.9 | 75 |
| Example 5-37 | Pd—TiC | 17.6 | 75 |
| Example 5-38 | Ir—TiC | 17.7 | 73 |
| Example 5-39 | Ag—TiC | 17.6 | 72 |
| Example 5-40 | Cu—TiC | 17.7 | 74 |
| Example 5-41 | Ru—TiC | 17.9 | 73 |
| Example 5-42 | Rh—TiC | 17.9 | 72 |
| Example 5-43 | Pt—TaC | 17.8 | 73 |
| Example 5-44 | Pd—TaC | 17.8 | 74 |
| Example 5-45 | Ir—TaC | 17.6 | 75 |
| Example 5-46 | Ag—TaC | 17.6 | 75 |
| Example 5-47 | Cu—TaC | 17.6 | 73 |
| Example 5-48 | Ru—TaC | 17.8 | 74 |
| Example 5-49 | Rh—TaC | 17.7 | 73 |
| Comparative Example | (conventional medium) | 15.4 | 109 |

EXAMPLE 6

2.5 inch hard disk shaped nonmagnetic glass substrates were prepared and various magnetic recording media were fabricated using the fabricating procedure of Example 4 except that an orientation control layer was disposed between soft magnetic under-layer and grain diameter control layer. Then various magnetic recording media were obtained. As the orientation control layer, 5 nm thick NiAl layer was deposited in 0.7 Pa Ar atmosphere preparing and using NiAl targets. In addition, magnetic recording media having orientation control layer of MgO, NiO, MnAl, Ge, Si and TiN, respectively, are fabricated.

Table 6 shows the recording and reproducing characteristics of each magnetic recording medium having CoCrPt—SiO$_2$ magnetic recording layer and Pt—TiN under-layer. It was found that the SNR$_m$ further increases by disposing the orientation control under-layer. Similar results were obtained for other magnetic recording media having other magnetic recording layer and under-layer combinations.

TABLE 6

| Example | Orientation Control Under-layer | Diameter Control Under-layer | SNR$_m$ [dB] | dPW$_{50}$ [nm] |
| --- | --- | --- | --- | --- |
| Example 6-1 | None | Cu | 17.7 | 73 |
| Example 6-2 | NiAl | Cu | 18.1 | 71 |
| Example 6-3 | MgO | Cu | 18.2 | 70 |
| Example 6-4 | NiO | Cu | 18.3 | 70 |
| Example 6-5 | MnAl | Cu | 18.1 | 71 |
| Example 6-6 | Ge | Cu | 18.1 | 70 |
| Example 6-7 | Si | Cu | 18.3 | 69 |
| Example 6-8 | TiN | Cu | 18.2 | 69 |
| Example 6-9 | None | Ni | 17.8 | 74 |
| Example 6-10 | NiAl | Ni | 18.4 | 70 |
| Example 6-11 | MgO | Ni | 18.2 | 70 |
| Example 6-12 | NiO | Ni | 18.4 | 70 |
| Example 6-13 | MnAl | Ni | 18.2 | 69 |
| Example 6-14 | Ge | Ni | 18.2 | 70 |
| Example 6-15 | Si | Ni | 18.3 | 71 |
| Example 6-16 | TiN | Ni | 18.4 | 71 |
| Example 6-17 | None | Rh | 17.5 | 75 |
| Example 6-18 | NiAl | Rh | 18.0 | 69 |
| Example 6-19 | MgO | Rh | 18.2 | 69 |
| Example 6-20 | NiO | Rh | 18.2 | 70 |
| Example 6-21 | MnAl | Rh | 18.3 | 71 |
| Example 6-22 | Ge | Rh | 18.3 | 71 |
| Example 6-23 | Si | Rh | 18.3 | 70 |
| Example 6-24 | TiN | Rh | 18.2 | 69 |

EXAMPLE 7

2.5 inch hard disk shaped nonmagnetic glass substrates were prepared and various magnetic recording media were fabricated using the fabricating procedure of Example 5 except that an orientation control layer was disposed between soft magnetic under-layer and grain diameter control layer. Table 7 shows the recording and reproducing characteristics of each magnetic recording medium having CoCrPt—SiO$_2$ magnetic recording layer and Pt—TiN under-layer. It was found that the SNR$_m$ further increases by disposing the orientation control under-layer. Similar results were obtained for other magnetic recording media having other magnetic recording layer and under-layer combinations.

TABLE 7

| Example | Orientation Control Under-layer | Diameter Control under-layer | SNR$_m$ [dB] | dPW$_{50}$ [nm] |
| --- | --- | --- | --- | --- |
| Example 7-1 | None | Cu | 17.6 | 76 |
| Example 7-2 | NiAl | Cu | 18.4 | 70 |
| Example 7-3 | MgO | Cu | 18.3 | 71 |
| Example 7-4 | NiO | Cu | 18.4 | 71 |
| Example 7-5 | MnAl | Cu | 18.5 | 72 |
| Example 7-6 | Ge | Cu | 18.2 | 71 |
| Example 7-7 | Si | Cu | 18.3 | 69 |
| Example 7-8 | None | Ni | 17.7 | 75 |
| Example 7-9 | NiAl | Ni | 18.3 | 71 |
| Example 7-10 | MgO | Ni | 18.3 | 69 |
| Example 7-11 | NiO | Ni | 18.2 | 72 |
| Example 7-12 | MnAl | Ni | 18.4 | 70 |
| Example 7-13 | Ge | Ni | 18.2 | 71 |
| Example 7-14 | Si | Ni | 18.3 | 70 |
| Example 7-15 | None | Rh | 17.6 | 77 |
| Example 7-16 | NiAl | Rh | 18.3 | 69 |
| Example 7-17 | MgO | Rh | 18.2 | 68 |
| Example 7-18 | NiO | Rh | 18.4 | 72 |
| Example 7-19 | MnAl | Rh | 18.3 | 70 |
| Example 7-20 | Ge | Rh | 18.2 | 69 |
| Example 7-21 | Si | Rh | 18.4 | 71 |

Although the prevent invention has been shown and described with respect to best mode embodiments thereof, it should be understood by those skilled in art that the foregoing and various other changes in the form and detail without departing from the spirit and scope of the present invention.

What is claimed is:

1. A magnetic recording medium, comprising:
a substrate;
an under-layer formed on the substrate;
a magnetic recording layer on the under-layer; and
a protecting layer formed on the magnetic recording layer,
wherein the under-layer includes a grain diameter control under-layer that consists of crystalline grains of at metal selected from the group consisting of Cu, Ni, Rh and Pt, and a deposited atom layer that consist of at least one selected from the group consisting of oxygen atoms and carbon atoms on the grain diameter control layer surface.

2. The magnetic recording medium as set forth in claim 1, wherein the deposited atom layer consist of the element atoms in a range from $1\times10^{13}$ atoms/cm$^2$ to $1\times10^{15}$ atoms/cm$^2$ on the average of areal density.

3. The magnetic recording medium as set forth in claim 1, wherein the average grain diameter of the crystalline grains of the grain diameter control under-layer is 50 nm or larger.

4. The magnetic recording medium as set forth in claim 1, wherein the grain diameter control under-layer consist of crystalline grains of a metal selected from the group consisting of Cu, Ni and Rh orienting (100) planes of the grains parallel to the substrate surface.

5. The magnetic recording medium as set forth in claim 1, wherein the magnetic recording layer comprises magnetic crystalline grains in an average areal density range from $1\times10^{12}$ grains/cm$^2$ to $8\times10^{12}$ grains/cm$^2$ held in plural on average on a crystalline grain of the large grain diameter under-layer.

6. The magnetic recording medium as set forth in claim 1, wherein the magnetic recording layer comprises magnetic crystalline grains arranged in a form of tetragonal lattice structure.

7. The magnetic recording medium as set forth in claim 1, wherein the grain diameter control under-layer consist of crystalline Pt grains orienting (111) planes of the grains parallel to the substrate surface.

8. The magnetic recording medium as set forth in claim 7, wherein the magnetic recording layer comprises magnetic crystalline grains in an average areal density range from $1\times10^{12}$ grains/cm$^2$ to $8\times10^{12}$ grains/cm$^2$ held in plural on average on a Pt crystalline grain of the under-layer.

9. The magnetic recording medium as set forth in claim 7, wherein the magnetic recording layer comprises magnetic crystalline grains arranged in a form of hexagonal lattice structure.

10. The magnetic recording medium as set forth in claim 1, wherein the magnetic recording layer comprises granular structure comprising magnetic crystalline grains and grain boundary regions enclosing each of the magnetic crystalline grains.

11. The magnetic recording medium as set forth in claim 1, wherein the magnetic recording layer comprises magnetic crystalline grains of at least one selected from the group consisting of Co—Cr, Co—Pt, Fe—Pt and Fe—Pd.

12. The magnetic recording medium as set forth in claim 1, wherein the magnetic recording medium comprises at least one intermediate under-layer between the magnetic recording layer and the under-layer accompanied with the deposited atom layer.

13. The magnetic recording medium as set forth in claim 12, wherein the intermediate under-layer comprises at least one granular structured layer comprising nonmagnetic crystalline grains and grain boundary regions enclosing each of the nonmagnetic crystalline grains.

14. The magnetic recording medium as set forth in claim 13, wherein the granular structured intermediate under-layer comprises nonmagnetic crystalline grains of at least one selected from the group consisting of Pt, Pd, Ir, Ag, Cu, Ru and Rh.

15. The magnetic recording medium as set forth in claim 1, wherein the magnetic recording medium comprises a soft magnetic under-layer having soft magnetic characteristics disposed between the grain diameter control under-layer and the substrate.

16. The magnetic recording medium as set forth in claim 15, wherein the magnetic recording medium comprises an under-layer having chemical composition of at least one selected from the group consisting of NiAl, MnAl, MgO, NiO, TiN, Si and Ge disposed between the grain diameter control under-layer and the soft magnetic under-layer.

17. A magnetic recording and reproducing apparatus, comprising:
a substrate, an under-layer formed on the substrate, a magnetic recording layer disposed on the under-layer, a protecting layer formed on the magnetic recording layer, the under-layer including a grain diameter control under-layer consisting of crystalline grains of a metal selected from the group consisting of Cu, Ni, Rh and Pt, and an deposited atom layer of at least one selected from the group consisting of oxygen atoms and carbon atoms on the grain diameter control layer surface;
a recording medium driving mechanism, driving the magnetic recording medium;
a recording and reproducing head mechanism, recording information to the magnetic recording medium and reproducing from the magnetic recording medium;
a head driving mechanism, driving the recording and reproducing head; and
a recording and reproducing signal processing system, processing recording signals and reproducing signals.

18. A magnetic recording and reproducing apparatus as set forth in claim 17, wherein the recording and reproducing head mechanism comprises a single pole head.

* * * * *